(12) United States Patent
Chow et al.

(10) Patent No.: US 12,489,711 B2
(45) Date of Patent: Dec. 2, 2025

(54) SYSTEMS AND METHODS FOR LOAD BALANCING TRAFFIC ACROSS COORDINATED BACKHAULS

(71) Applicant: ASSIA SPE, LLC, Wilmington, DE (US)

(72) Inventors: Peter Chow, Los Altos, CA (US); Ramya Bhagavatula, Palo Alto, CA (US); Wonjong Rhee, Palo Alto, CA (US); Ardavan Maleki Tehrani, Atherton, CA (US); John M. Cioffi, Atherton, CA (US); Stefano Galli, New York, NY (US); Sungho Yun, San Jose, CA (US); Kenneth J. Kerpez, Long Valley, NJ (US); Marc Goldburg, Redwood City, CA (US)

(73) Assignee: ASSIA SPE, LLC, Redwood City, CA (US)

( * ) Notice: Subject to any disclaimer, the term of this patent is extended or adjusted under 35 U.S.C. 154(b) by 0 days.

(21) Appl. No.: 18/382,496

(22) Filed: Oct. 21, 2023

(65) Prior Publication Data

US 2024/0048491 A1 Feb. 8, 2024

Related U.S. Application Data

(63) Continuation of application No. 15/845,977, filed on Dec. 18, 2017, now Pat. No. 11,799,781, which is a
(Continued)

(51) Int. Cl.
*H04L 47/125* (2022.01)
*H04L 12/28* (2006.01)
(Continued)

(52) U.S. Cl.
CPC ........ *H04L 47/125* (2013.01); *H04L 12/2854* (2013.01); *H04L 41/0659* (2013.01);
(Continued)

(58) Field of Classification Search
CPC .............. H04L 47/125; H04L 12/2854; H04L 41/0659; H04L 41/0893; H04L 45/22;
(Continued)

(56) References Cited

U.S. PATENT DOCUMENTS 5,970,064 A   10/1999  Clark et al.
8,516,158 B1 *  8/2013  Wu ..................... H04L 67/5681
                                                  709/231
(Continued)

OTHER PUBLICATIONS

Canadian office action mailed Aug. 14, 2024 in related Canadian patent application No. 3,171,617, (3 pgs).
(Continued)

*Primary Examiner* — Walli Z Butt
(74) *Attorney, Agent, or Firm* — Michael North

(57) ABSTRACT

In accordance with embodiments disclosed herein, there are provided methods, systems, mechanisms, techniques, and apparatuses for traffic aggregation on multiple Wide Area Network (WAN) backhauls and multiple distinct Local Area Network (LAN) networks; for traffic load balancing on multiple WAN backhauls and multiple distinct LAN networks; and for performing self-healing operations utilizing multiple WAN backhauls serving multiple distinct LAN networks. For example, in one embodiment, a first Local Area Network LAN access device is to establish a first LAN; a second LAN access device is to establish a second LAN; a first Wide Area Network WAN backhaul connection is to provide the first LAN access device with WAN connectivity; a second WAN backhaul connection to provide the second LAN access device with WAN connectivity; a management device is communicatively interfaced with each of the first
(Continued)

LAN access device, the second LAN access device, the first WAN backhaul connection, and the second WAN backhaul connection; and the management device routes a first portion of traffic originating from the first LAN over the first WAN backhaul connection and routes a second portion of the traffic originating from the first LAN over the second WAN backhaul connection.

19 Claims, 27 Drawing Sheets

Related U.S. Application Data continuation of application No. 14/362,585, filed as application No. PCT/US2011/063327 on Dec. 5, 2011, now Pat. No. 9,847,944.

(51) Int. Cl.
| | |
|---|---|
| H04L 41/0659 | (2022.01) |
| H04L 45/00 | (2022.01) |
| H04L 45/24 | (2022.01) |
| H04L 47/10 | (2022.01) |
| H04L 47/70 | (2022.01) |
| H04L 47/762 | (2022.01) |
| H04L 47/78 | (2022.01) |
| H04L 61/2514 | (2022.01) |
| H04L 41/0895 | (2022.01) |
| H04L 41/344 | (2022.01) |
| H04L 45/28 | (2022.01) |

(52) U.S. Cl.
CPC ............ *H04L 45/22* (2013.01); *H04L 45/245* (2013.01); *H04L 47/13* (2013.01); *H04L 47/762* (2013.01); *H04L 47/781* (2013.01); *H04L 47/822* (2013.01); *H04L 61/2514* (2013.01); *H04L 41/0895* (2022.05); *H04L 41/344* (2022.05); *H04L 45/28* (2013.01); *Y02D 30/50* (2020.08)

(58) Field of Classification Search
CPC ..... H04L 45/245; H04L 47/13; H04L 47/762; H04L 47/781; H04L 47/822; H04L 61/2514; H04L 41/0895; H04L 41/344; H04L 45/28; Y02D 30/50
See application file for complete search history.

(56) References Cited

U.S. PATENT DOCUMENTS

| | | | |
|---|---|---|---|
| 11,799,781 B2* | 10/2023 | Chow | ................... H04L 47/781 |
| 2004/0142692 A1 | 7/2004 | Schwarz et al. | |
| 2005/0208946 A1 | 9/2005 | Kahana | |
| 2008/0126548 A1 | 5/2008 | Moore et al. | |
| 2009/0059872 A1 | 3/2009 | Malik et al. | |
| 2010/0290465 A1 | 11/2010 | Ankaiah et al. | |
| 2011/0151857 A1 | 6/2011 | Park et al. | |
| 2011/0182182 A1* | 7/2011 | Yang | ..................... H04L 47/125 |
| | | | 370/235 |
| 2011/0273979 A1 | 11/2011 | Grabelsky et al. | |

OTHER PUBLICATIONS

Response to Canadian office action filed Oct. 21, 2024 in related Canadian patent application No. 3,171,617, (3 pgs).
Notice of allowance mailed Jul. 24, 2024 in related U.S. Appl. No. 18/372,124, (17 pgs).
Response to European examination report filed Aug. 21, 2024 in related European application No. 18160805.0, (3 pgs).
Restriction requirements mailed Sep. 24, 2024 in related U.S. Appl. No. 17/712,177, (6 pgs).
Response to European office action filed Nov. 13, 2023, in related European patent application No. 18211162.5, (8 pgs).
European notice of allowance mailed Dec. 18, 2023 in related European patent application No. 18211162.5, (8 pgs).
Canadian office action mailed Dec. 15, 2023 in related Canadian patent application No. 3,171,617, (3 pgs).
Response to Canadian office action filed Apr. 3, 2024 in related Canadian patent application No. 3,171,617, (6 pgs).
European notice of allowance mailed Dec. 7, 2023 in related European patent application No. 11787994.0, (2 pgs).
European office action mailed Feb. 6, 2024 in related European patent application No. 23220337.2, (1 pg).
Response to European office action filed Apr. 4, 2024 in related European patent application No. 23220337.2, (1 pg).
Restriction requirement mailed Apr. 5, 2024 in related U.S. Appl. No. 17/712,177, (6 pgs).
Response to restriction requirement filed Jun. 27, 2024 in related U.S. Appl. No. 17/712,177, (12 pgs).
Non-Final office action mailed May 22, 2024 in related U.S. Appl. No. 18/372,124, (16 pgs).
Response to Non-Final office action filed Jul. 3, 2024 in related U.S. Appl. No. 18/372,124, (7pgs).
European office action mailed Apr. 25, 2024 in related European patent application No. 18160805.0, (9 pgs).
Australian office action mailed Dec. 18, 2024 in related Australian patent application No. 2022203633, (3 pgs).
European office action mailed Jan. 14, 2025 in related European patent application No. 18160805.0, (9 pgs).
Restriction requirement mailed Dec. 23, 2024 in related U.S. Appl. No. 17/712,177, (6 pgs).
Restriction requirement response filed Feb. 24, 2025 in related U.S. Appl. No. 17/712,177, (11 pgs).
Notice of allowance mailed May 22, 2025 in related U.S. Appl. No. 17/712,177, (50 pgs).
Response to European office action filed Sep. 26, 2025 in related European patent application No. 18160805.0, (4 pgs).

\* cited by examiner

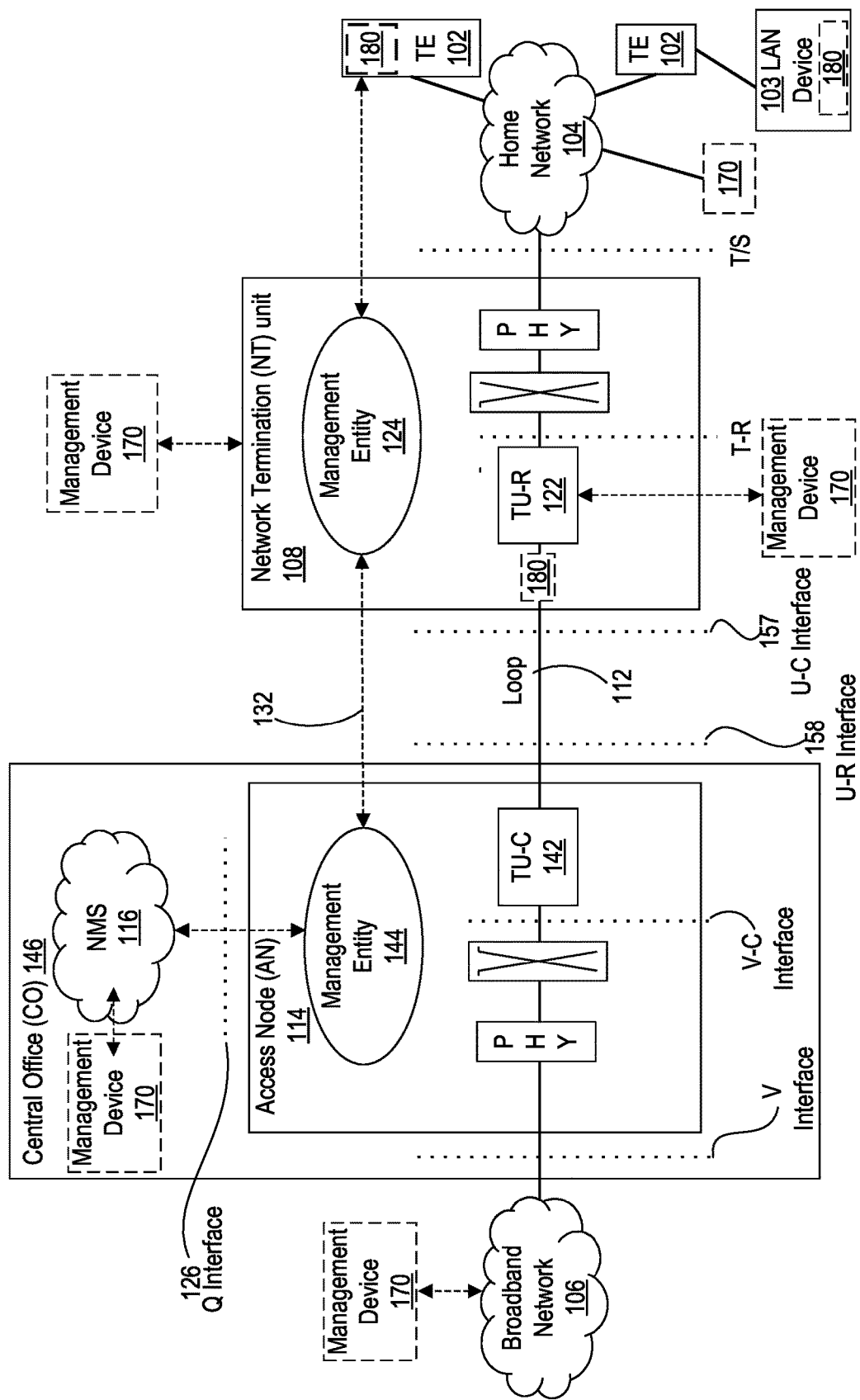

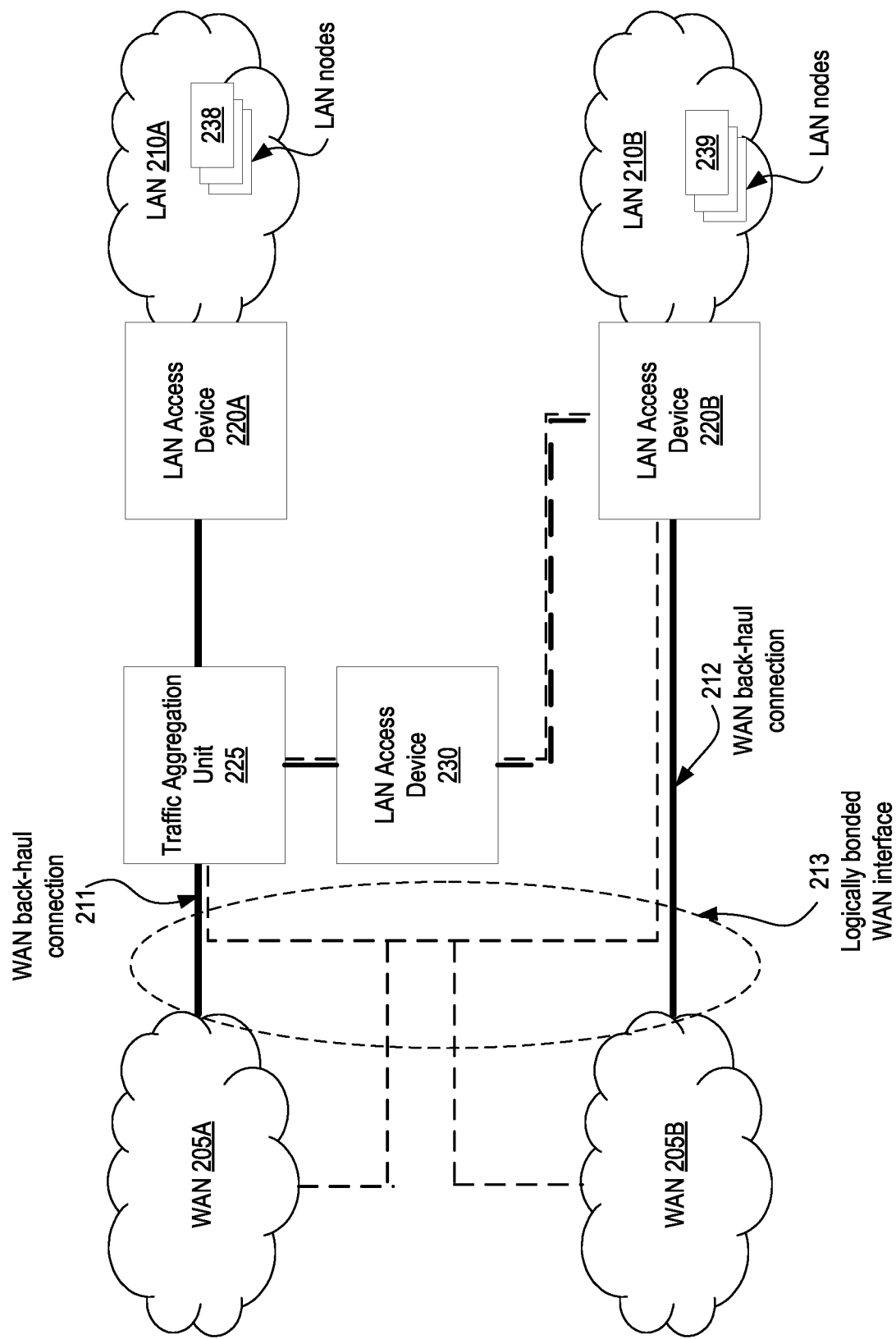

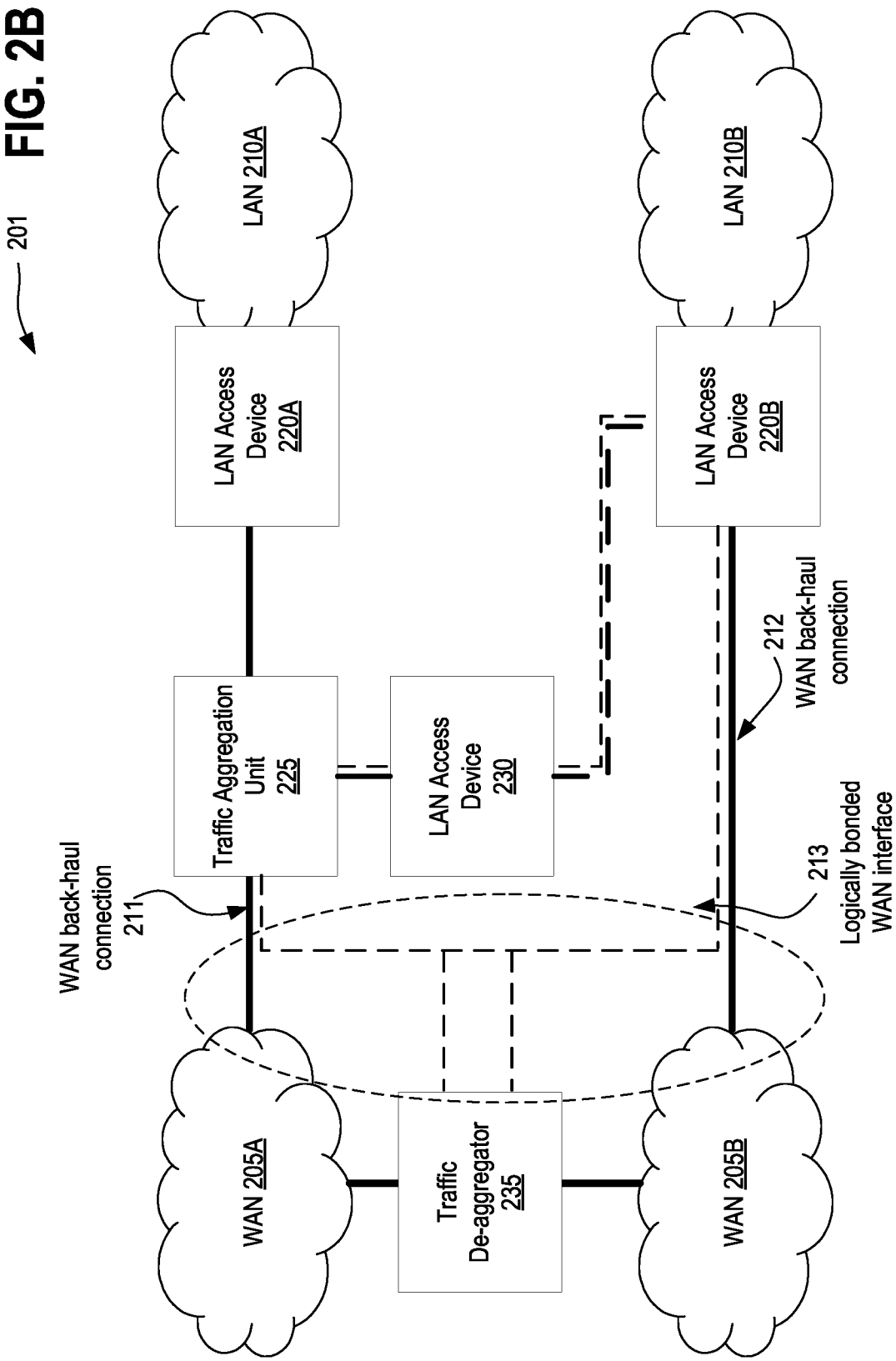

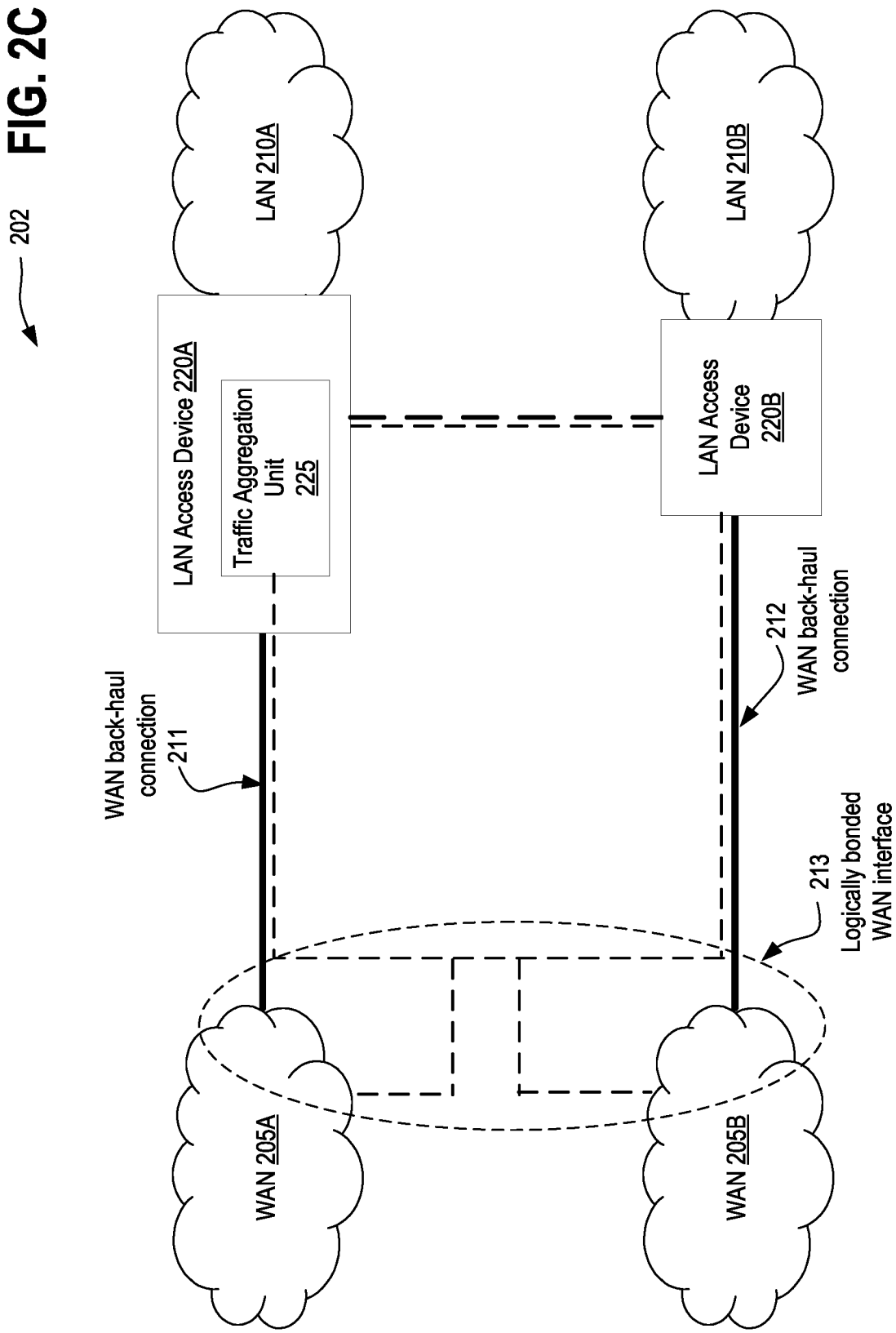

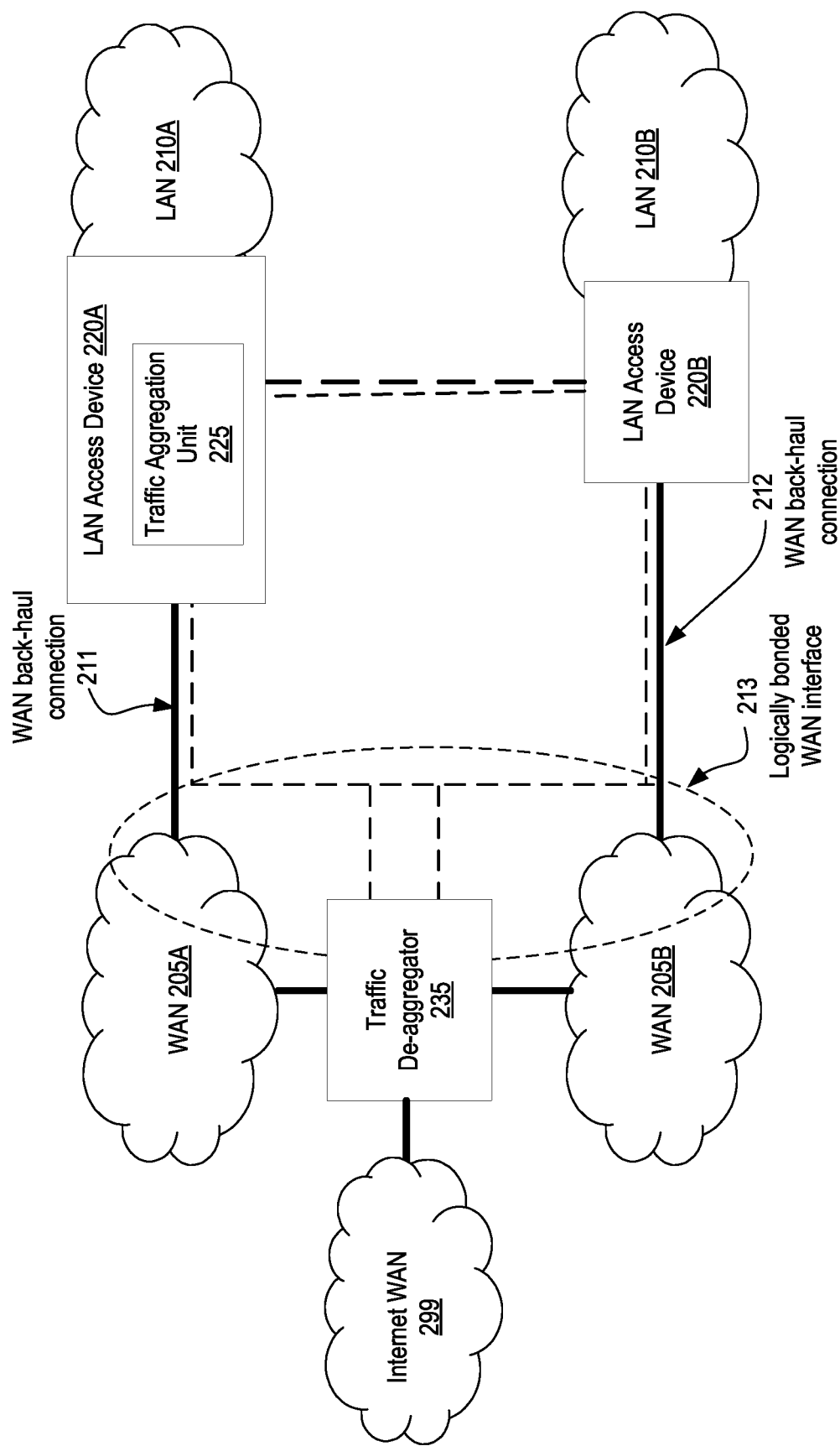

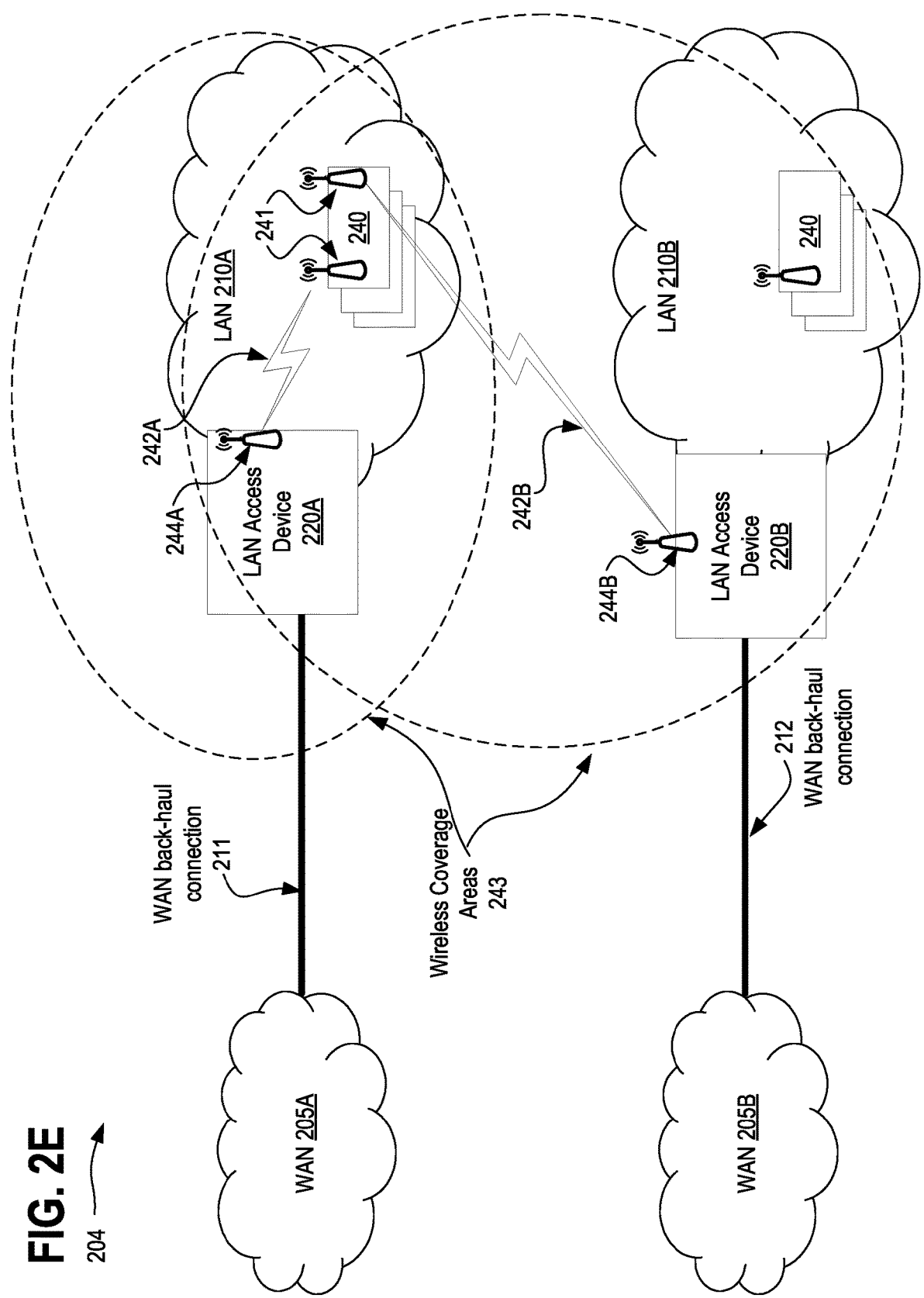

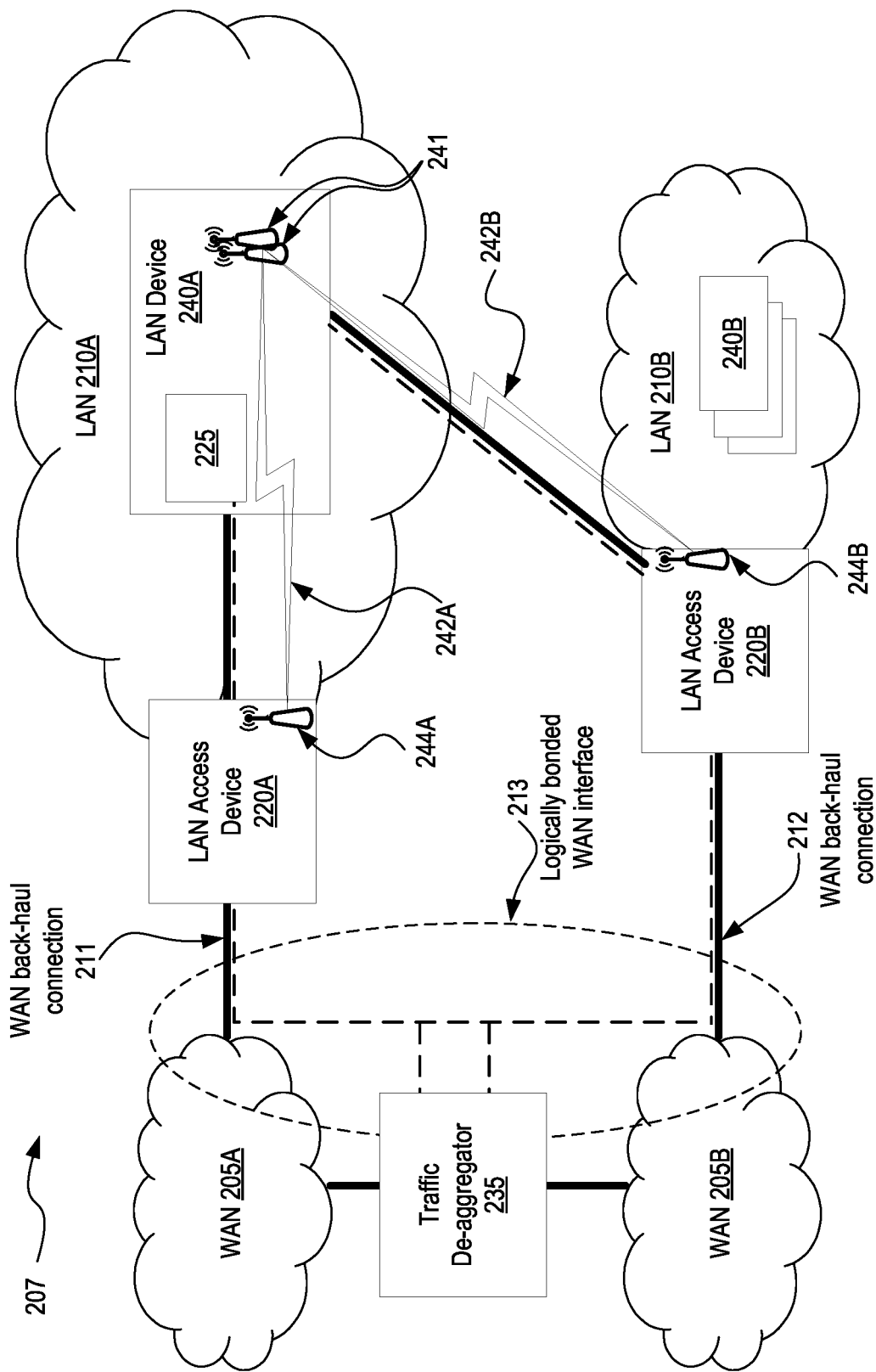

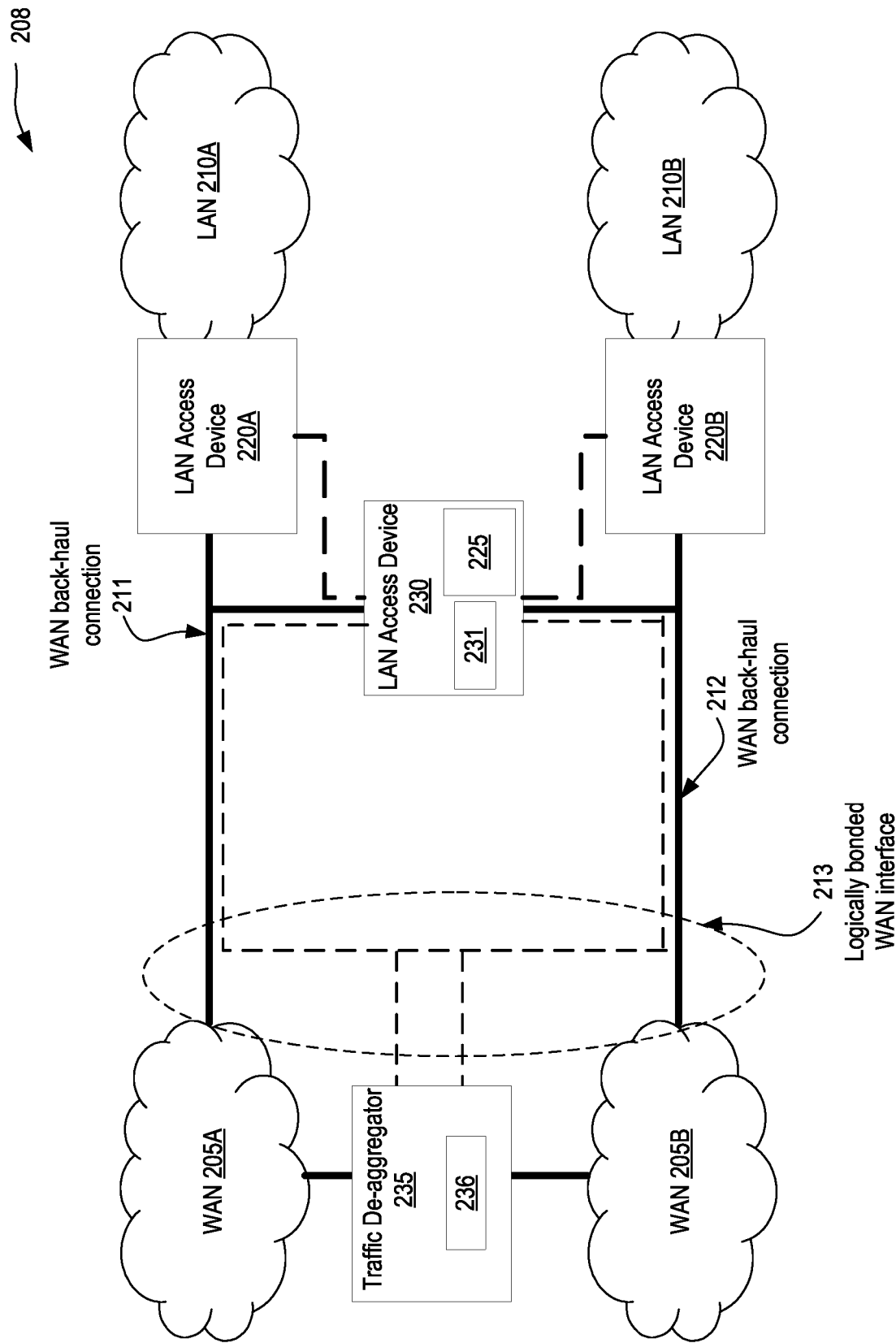

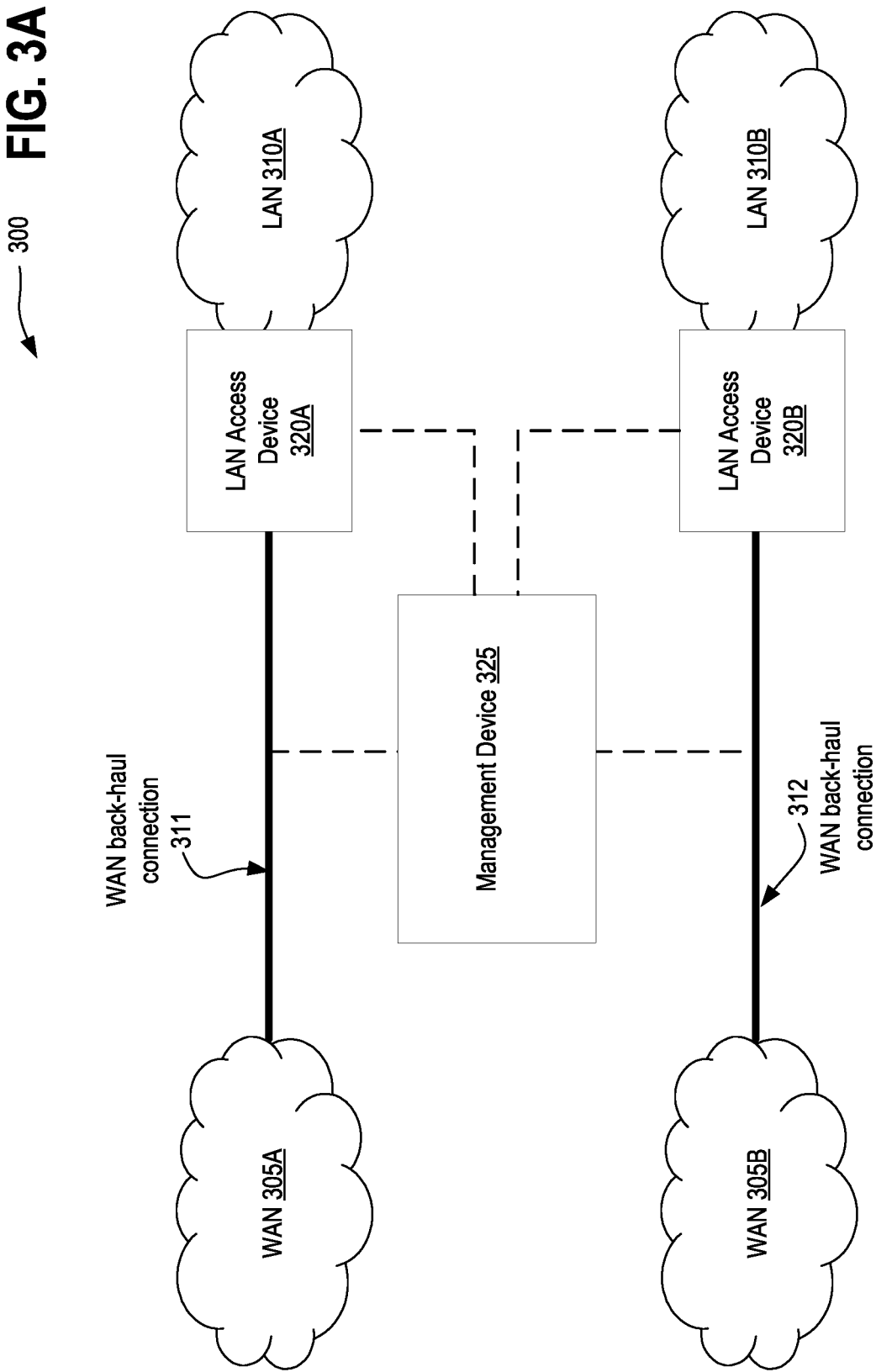

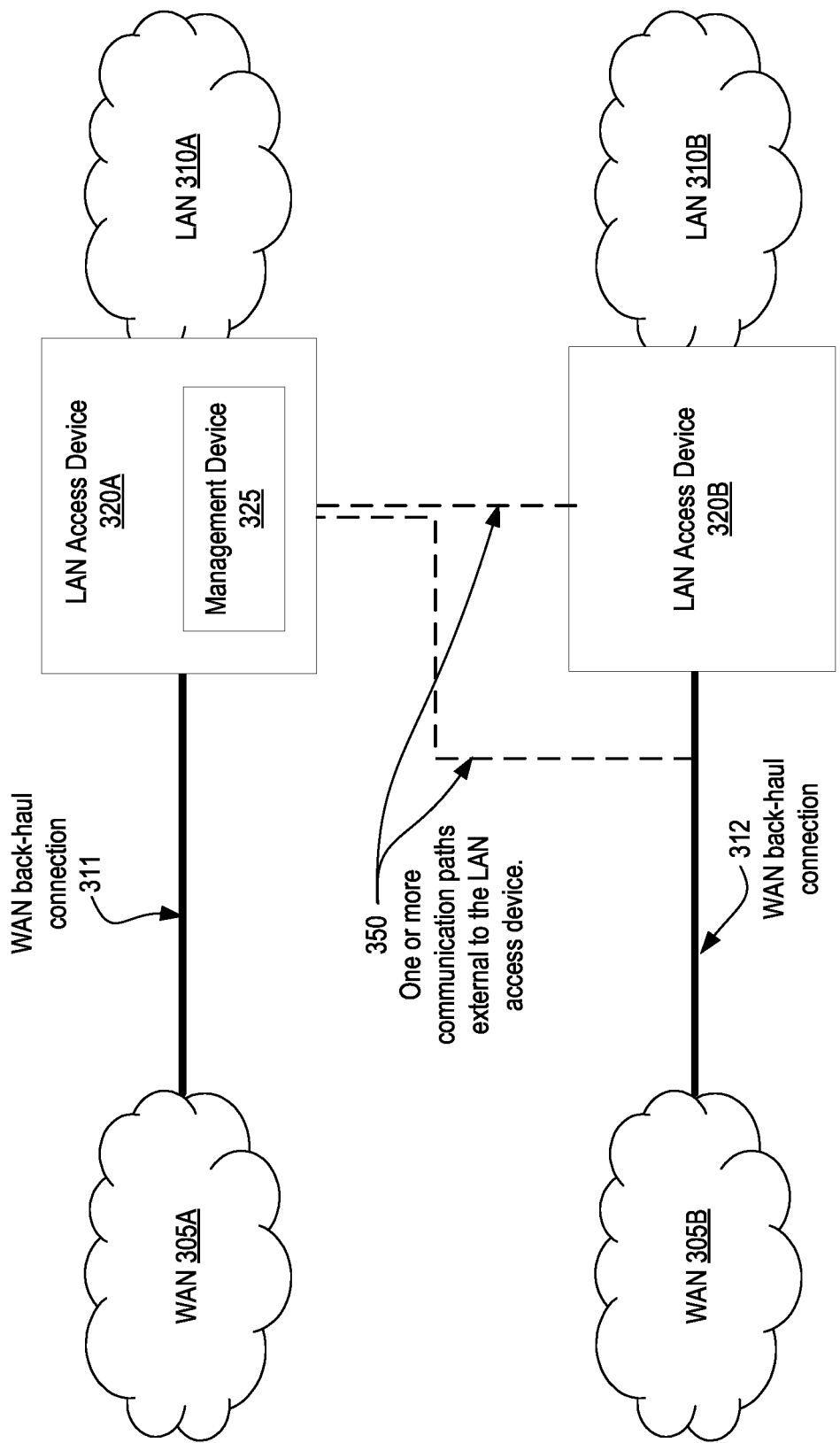

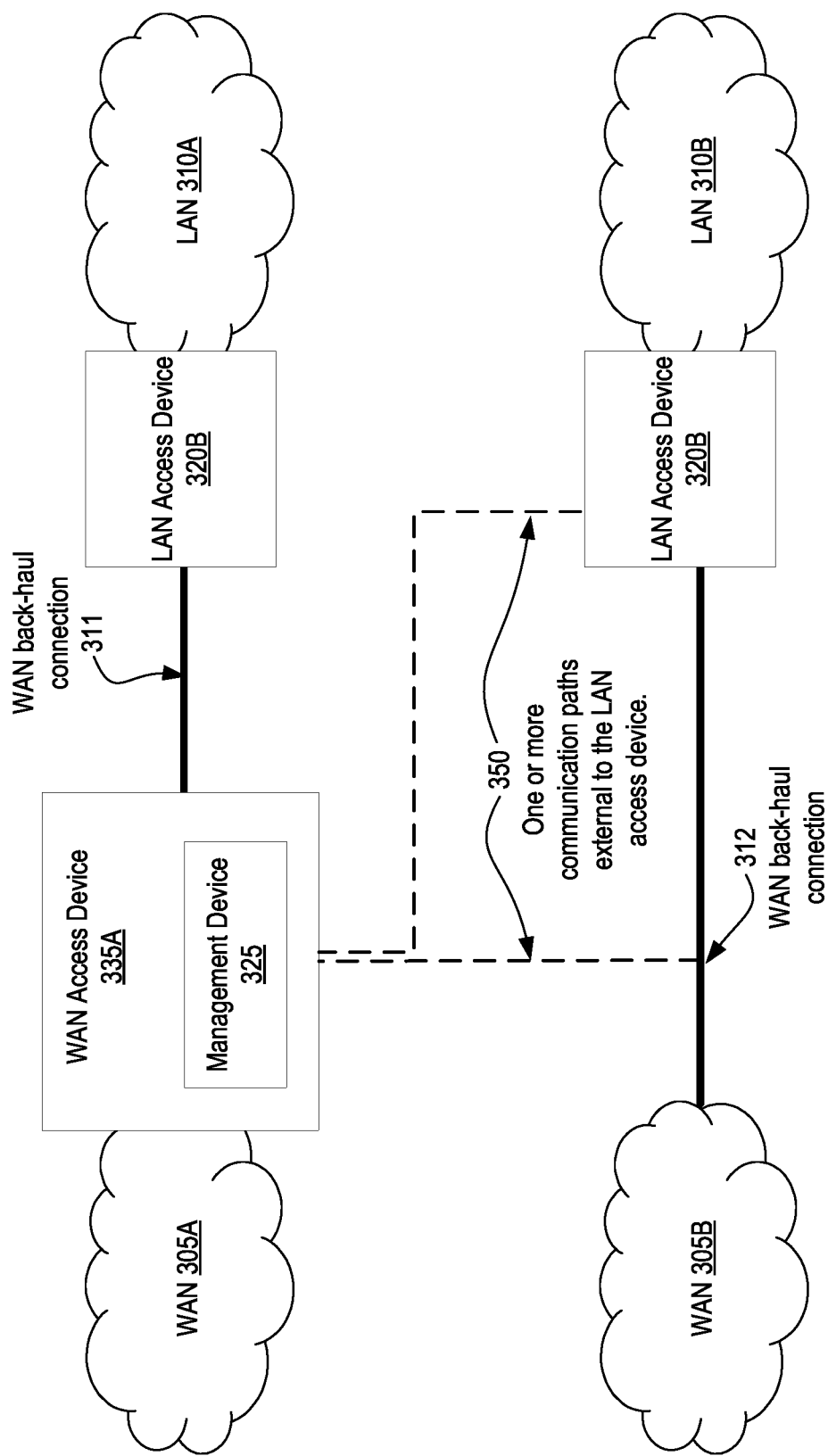

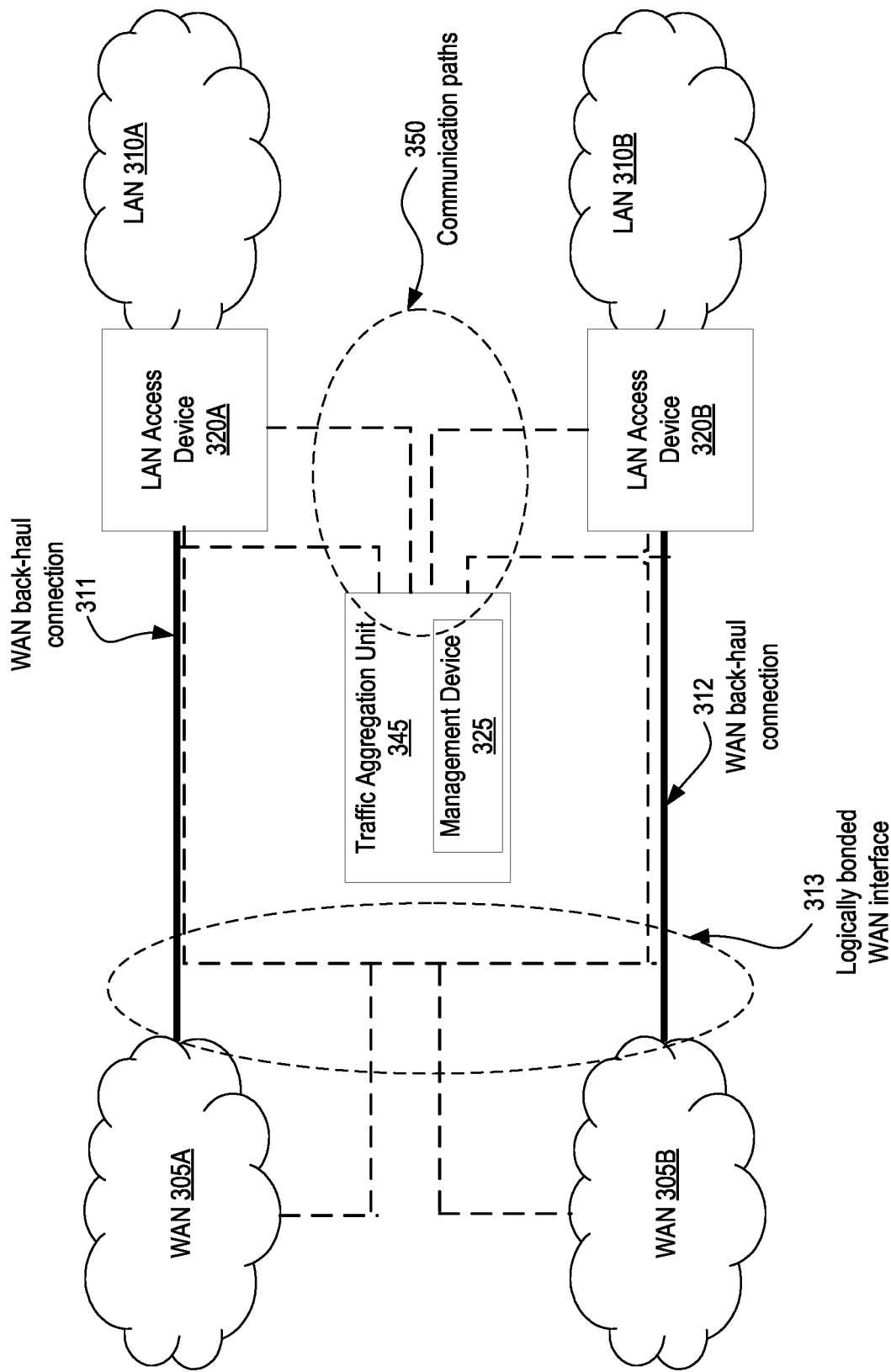

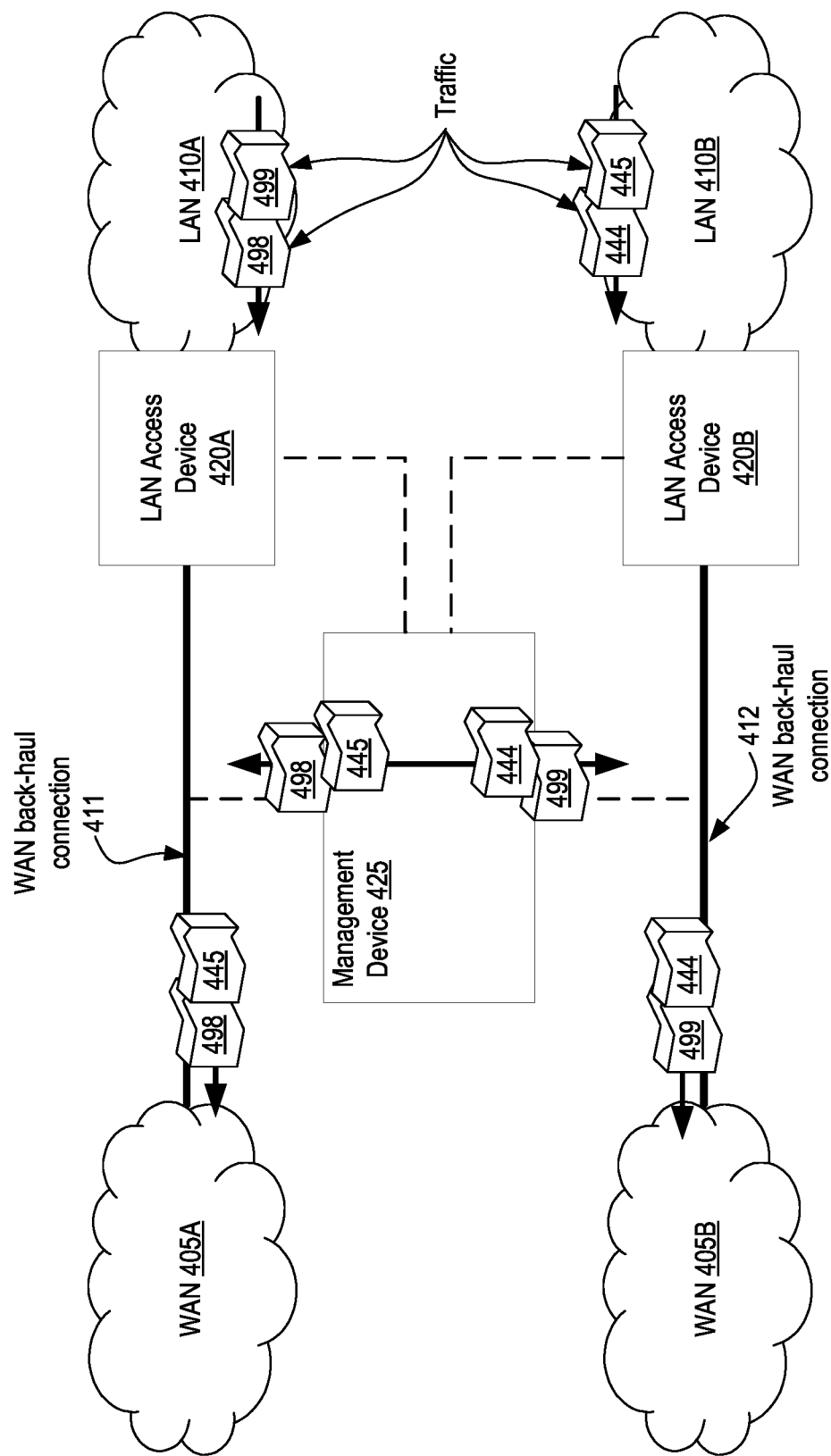

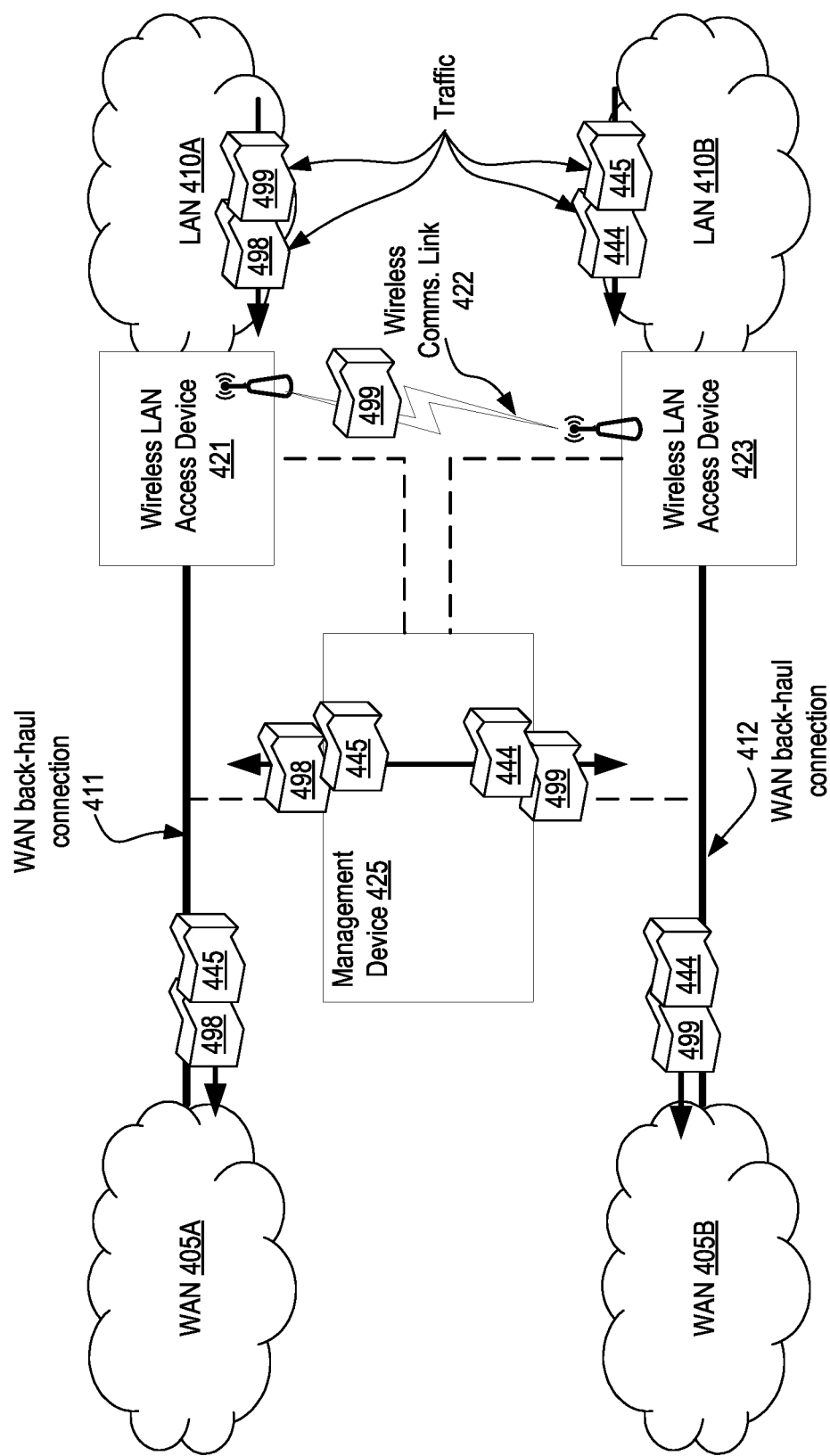

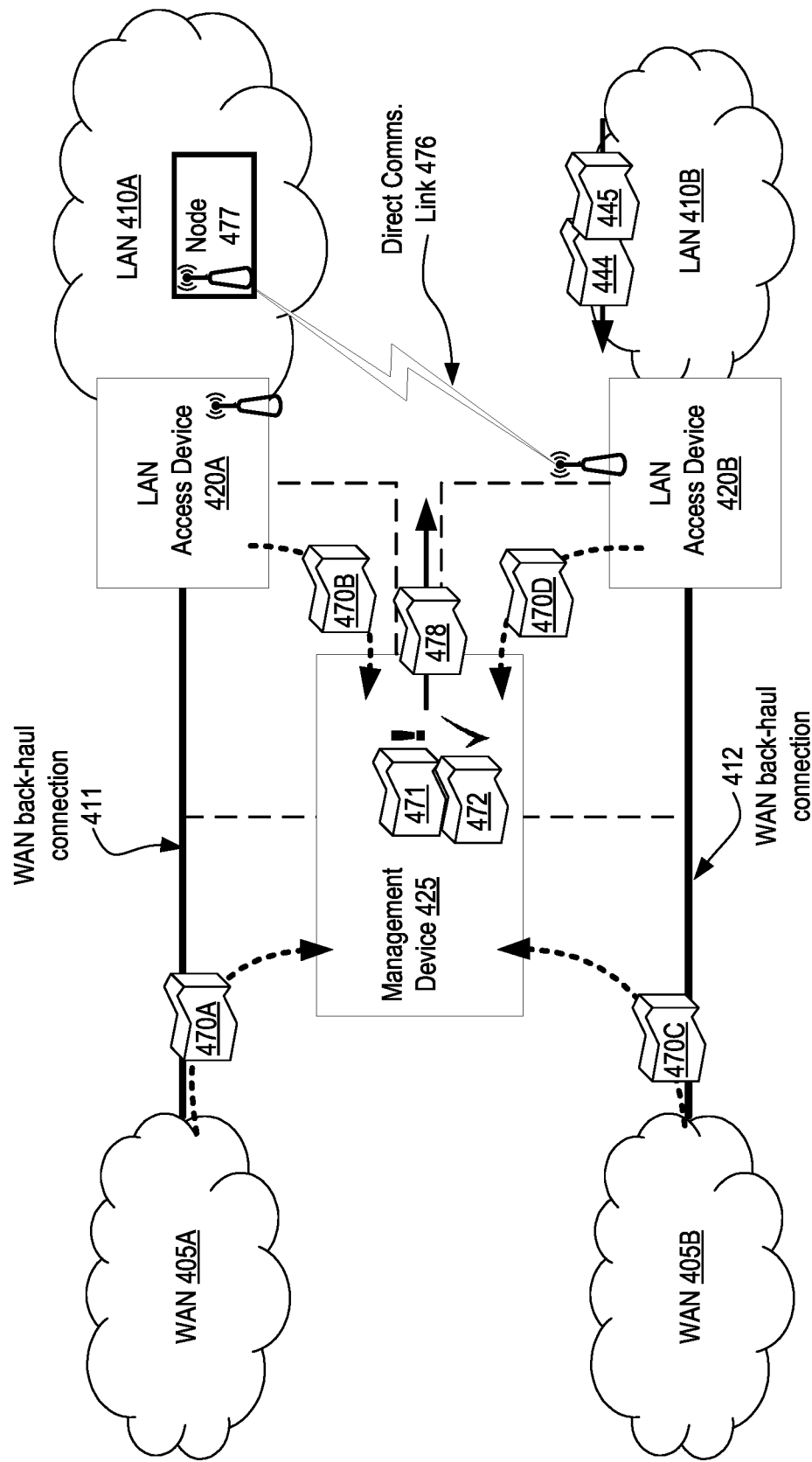

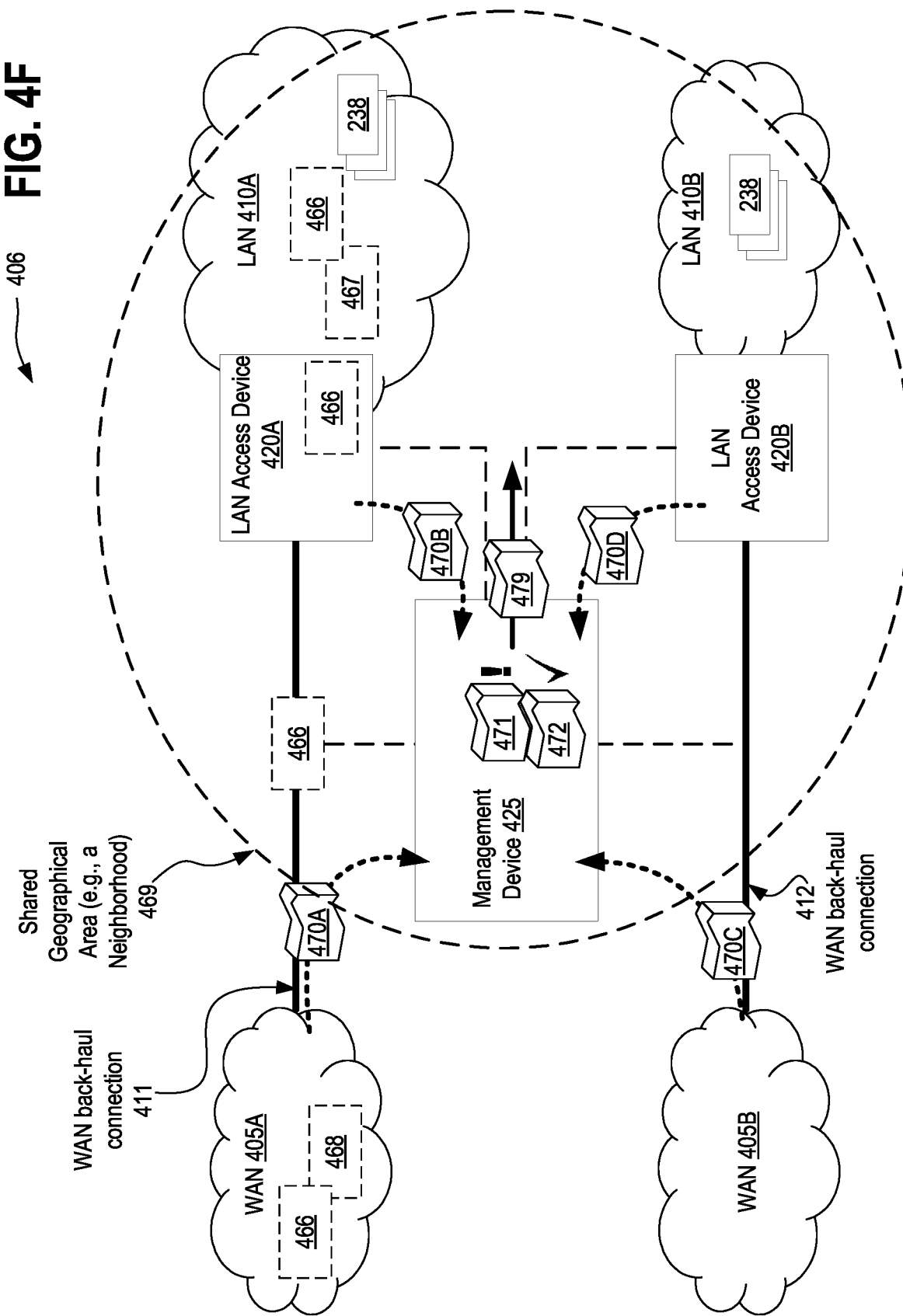

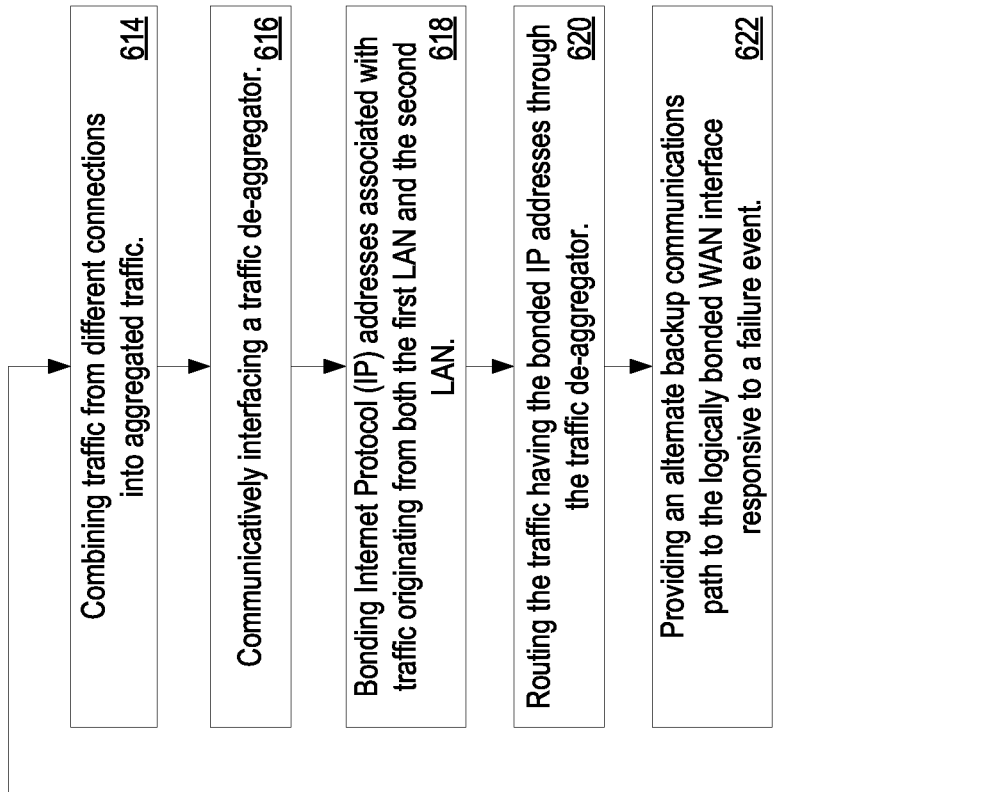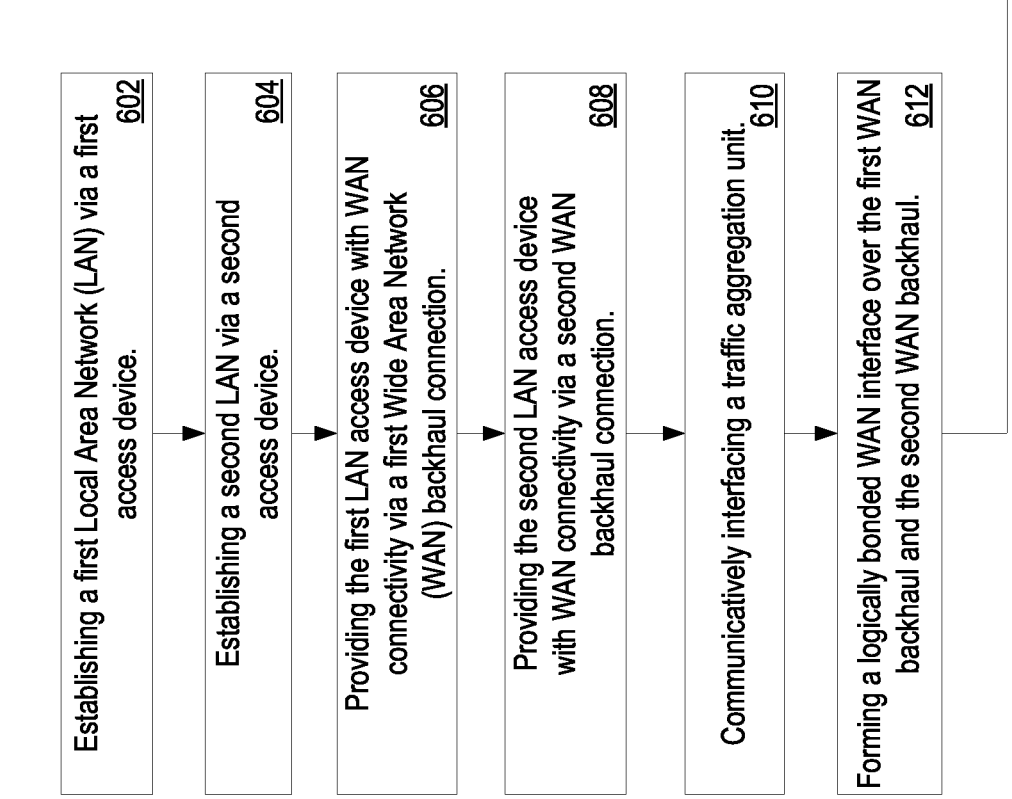
FIG. 6A

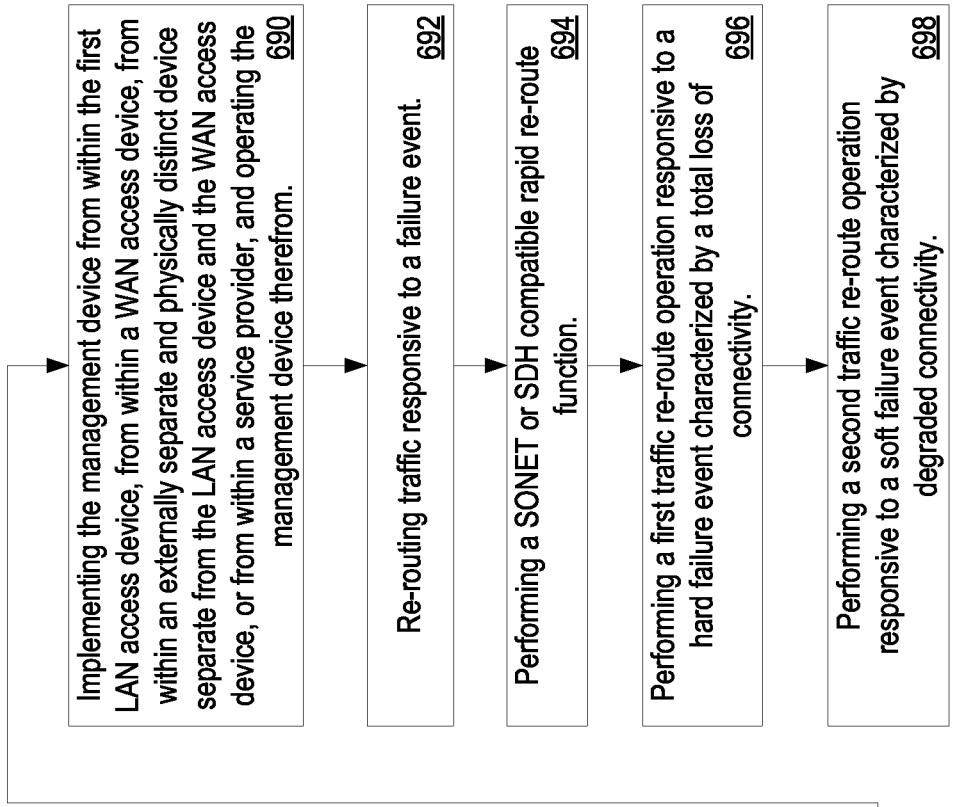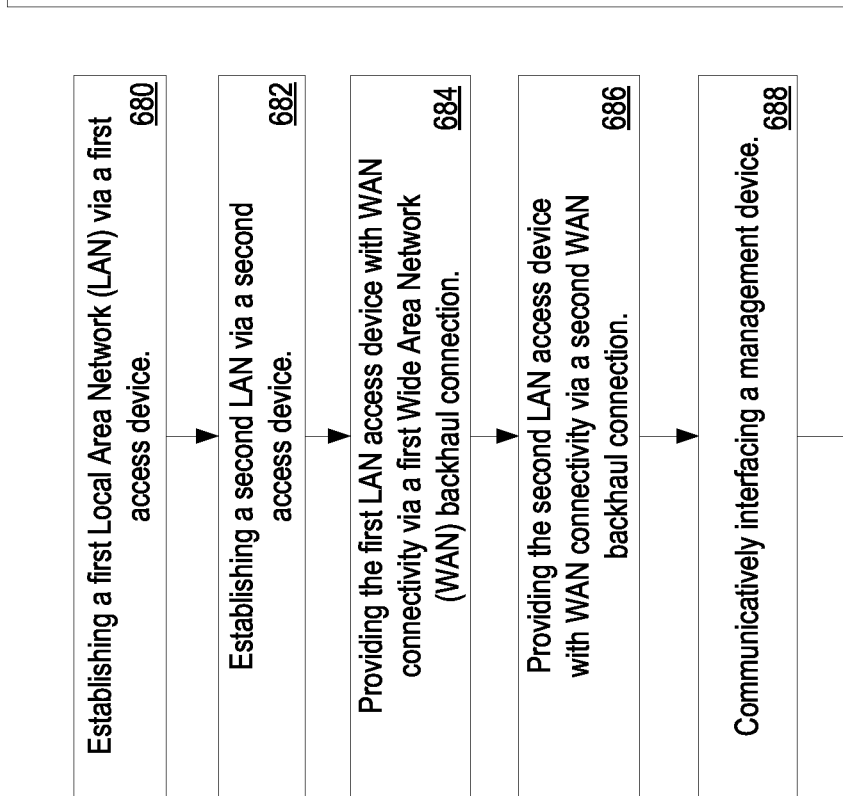
FIG. 6C

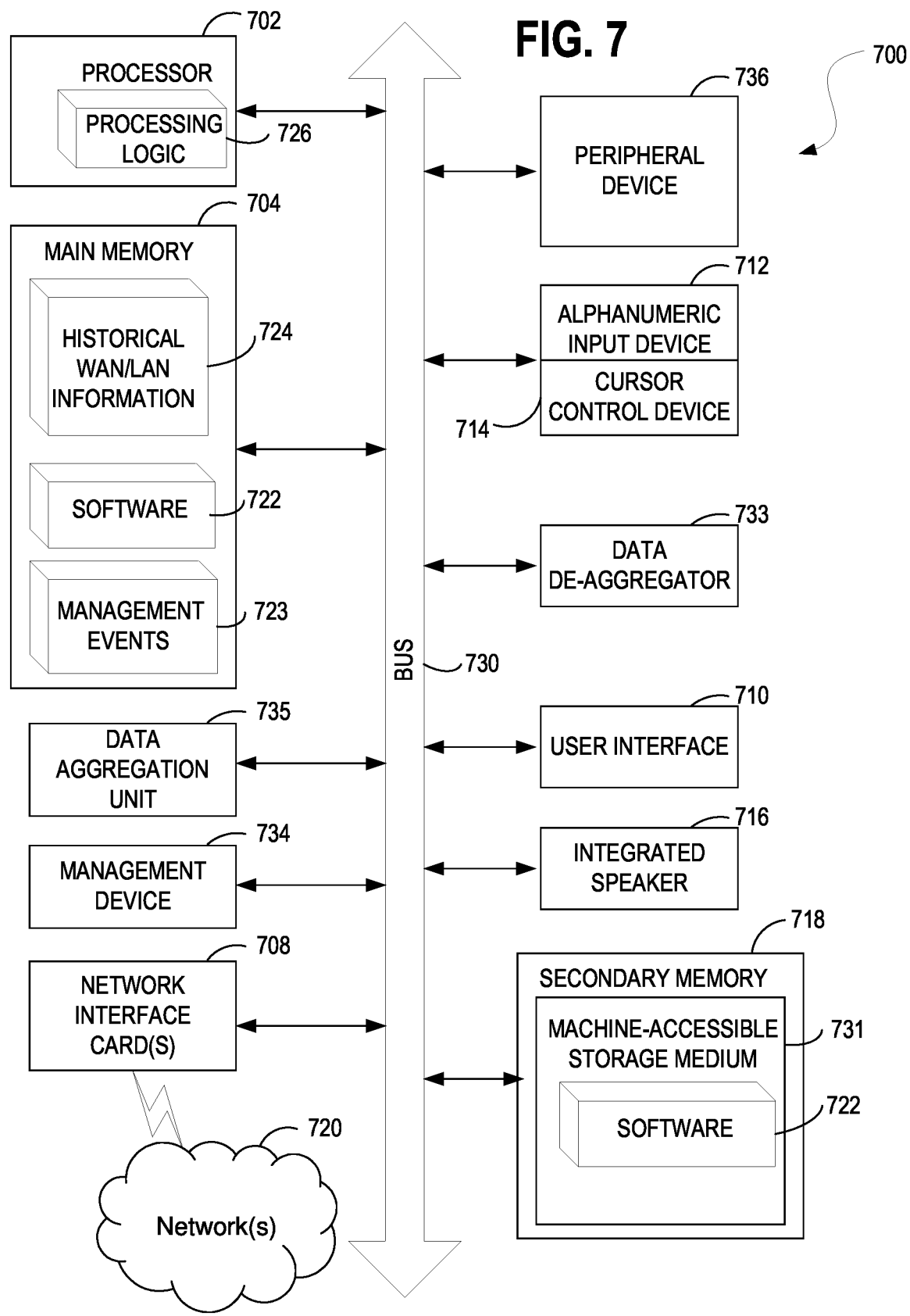

SYSTEMS AND METHODS FOR LOAD BALANCING TRAFFIC ACROSS COORDINATED BACKHAULS

CROSS REFERENCE TO RELATED APPLICATIONS

The present application is a continuation of and claims priority benefit under 35 U.S.C. § 120, to co-pending U.S. patent application Ser. No. 15/845,977, entitled, "Systems and Methods for Traffic Load Balancing on Multiple WAN Backhauls and Multiple Distinct LAN Networks", naming as inventors Peter Chow, Ramya Bhagavatula, Wongjong Rhee, Ardavan Maleki Tehrani, John Cioffi, Stefano Galli, Sungho Yun, Kenneth Kerpez and Marc Goldburg, and filed Dec. 18, 2017, which claims priority to the U.S. patent application Ser. No. 14/362,585, entitled "Systems and Methods for Traffic Load Balancing on Multiple WAN Backhauls and Multiple Distinct LAN Networks", naming as inventors Peter Chow, Ramya Bhagavatula, Wongjong Rhee, Ardavan Maleki Tehrani, John Cioffi, Stefano Galli, Sungho Yun, Kenneth Kerpez and Marc Goldburg, and filed Jun. 3, 2014, which claims priority to International PCT Patent Application No. PCT/US11/63327, entitled "Systems and Methods for Traffic Load Balancing on Multiple WAN Backhauls and Multiple Distinct LAN Networks", and filed Dec. 5, 2011. Each reference mentioned in this patent document is hereby incorporated herein by reference in its entirety.

A. TECHNICAL FIELD

The subject matter described herein relates generally to the field of computing, and more particularly, to systems and methods for traffic aggregation on multiple WAN backhauls and multiple distinct LAN networks; to systems and methods for traffic load balancing on multiple WAN backhauls and multiple distinct LAN networks; and to systems and methods for performing self-healing operations utilizing multiple WAN backhauls serving multiple distinct LAN networks.

B. DESCRIPTION OF THE RELATED ART

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

The "Internet" is a Wide Area Network that joins together many other networks, providing a communications path between devices operating within distinct and often geographically dispersed networks. A Local Area Network (LAN) enables multiple distinct devices within an end-user's premises to communicate amongst themselves locally. Home LAN technologies include wired Ethernet, WiFi, power line, coax, phoneline and other transmission systems. An end-user's LAN is often connected to the Internet via a WAN backhaul connection to an Internet Service Provider (ISP) that provides the end-user consumer with Internet connectivity and Internet Bandwidth. WAN backhaul technologies include DSL, cable modems, fiber, and wireless. Devices within the end-user's LAN may communicate with devices external to the LAN over the WAN backhaul connection provided by the end-user's ISP.

Traditionally, the WAN is controlled, managed and maintained by service providers, such as Internet Service Providers, Telecommunications Operators, etc. Conversely, a LAN is typically managed and maintained at a customer's premises by end users/customers, which may be residential users or commercial/business customers. Moreover, operators and service providers typically refrain from addressing any LAN related problems, notwithstanding the fact that, at times, some problems and issues exhibited via the LAN may be related to WAN configurations and settings. Opportunities for enhanced management of the LAN to WAN interfaces may benefit LANs, LAN devices, and end-to-end service delivery. However, such enhanced management opportunities have not yet been made available to the relevant consuming public and have not yet been explored in earnest by relevant Service Providers.

The present state of the art may therefore benefit from systems and methods for traffic aggregation on multiple WAN backhauls and multiple distinct LAN networks; systems and methods for traffic load balancing on multiple WAN backhauls and multiple distinct LAN networks; and systems and methods for performing self-healing operations utilizing multiple WAN backhauls serving multiple distinct LAN networks, each of which are described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 illustrates an exemplary architecture in which embodiments may operate;

FIGS. 2A, 2B, 2C, 2D, 2E, 2F, 2G, and 2H illustrate alternative exemplary architectures in which embodiments may operate;

FIGS. 3A, 3B, 3C, 3D, and 3E illustrate alternative exemplary architectures in which embodiments may operate;

FIGS. 4A, 4B, 4C, 4D, 4E, 4F, and 4G illustrate alternative exemplary architectures in which embodiments may operate;

FIGS. 6A, 6B, and 6C are flow diagrams illustrating methods for traffic aggregation; methods for traffic load balancing; and methods for performing self-healing in accordance with described embodiments; and FIG. 7 illustrates a diagrammatic representation of a machine in the exemplary form of a computer system, in accordance with one embodiment.

DETAILED DESCRIPTION

Figure 2F:
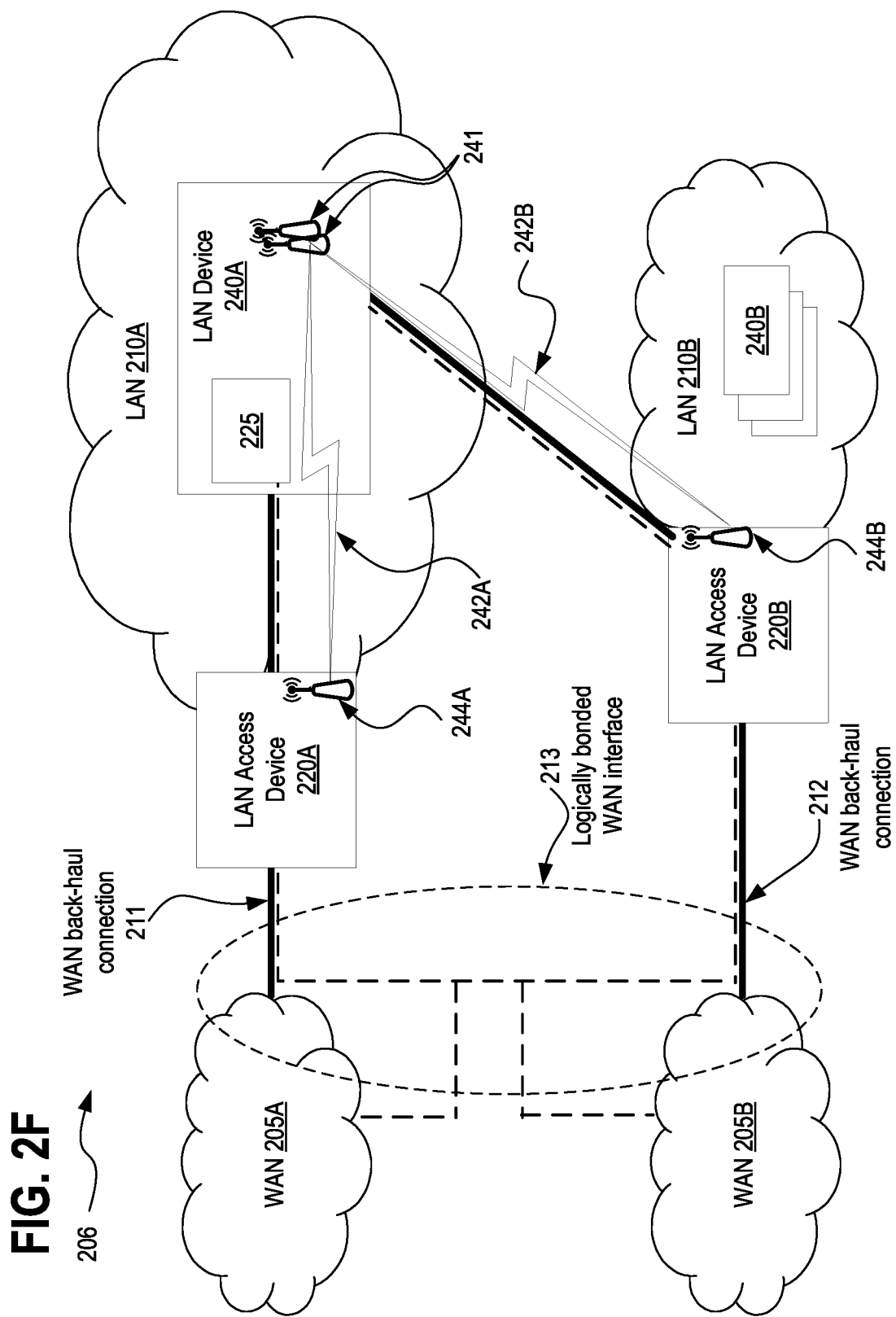

Described herein are systems and methods for traffic aggregation on multiple WAN backhauls and multiple distinct LAN networks; systems and methods for traffic load balancing on multiple WAN backhauls and multiple distinct LAN networks; and systems and methods for performing self-healing operations utilizing multiple WAN backhauls serving multiple distinct LAN networks.

Demand for data traffic is bursty, with frequent large changes in traffic. Demand for streaming services such as video can also vary substantially as sessions come and go, such as when turning a TV on and off. Moreover, the supply of bandwidth can vary considerably, with different LAN connections such as wireless proving different bit rates, and different WAN connections such as broadband access backhaul also providing different bit rates. It is often the case that when one line is heavily loaded, an adjacent line is lightly loaded. Traffic aggregation takes advantage of this, statistically smoothing demand and supply by pooling multiple users together into a single logically created connection.

LAN/WAN bonding solutions heretofore have been limited to specific pre-determined implementations. The traffic aggregation mechanisms disclosed herein are more dynamic in nature and allow for combining traffic across different WAN backhauls and LAN networks in an adaptive fashion. Traffic aggregation might include, among other things, techniques such as packet reordering, classification by packet type (control or data), etc. Traffic can also be aggregated across devices in different subnets, networks being serviced by different service providers, etc. Certain traffic aggregation mechanisms do not differentiate incoming traffic on the basis of traffic flows, so that resources are allocated to the whole set of flows. There are also traffic aggregation mechanisms that do not treat all incoming traffic as the same and each flow can be allocated its own dedicated resources. Any traffic handling scheme presents different requirements in terms of link capacity and also has its own sensitivity to changes in the traffic load offered to the network. This interdependency between the performance of traffic aggregation schemes and link status (capacity, offered load, flow characteristics, etc.) is present regardless of whether aggregation is performed by aggregating traffic over a single connection or by switching or routing physically or logically distinct traffic sources and sinks over different connections, and in both cases requires to adapt configuration to the specific scenario at hand. Traffic aggregation is thus more adaptive and may be adapted to suit the situation at hand where as bonding tends to be more static.

For example, in one embodiment, a first Local Area Network (LAN) access device is to establish a first LAN; a second LAN access device is to establish a second LAN; a first Wide Area Network (WAN) backhaul connection is to provide the first LAN access device with WAN connectivity; a second WAN backhaul connection is to provide the second LAN access device with WAN connectivity; and a traffic aggregation unit is to form a logically bonded WAN interface over the first WAN backhaul and the second WAN backhaul. In some embodiments an optional traffic de-aggregation unit may be used.

In another embodiment, a first Local Area Network (LAN) access device is to establish a first LAN; a second LAN access device is to establish a second LAN; a first Wide Area Network (WAN) backhaul connection is to provide the first LAN access device with WAN connectivity; a second WAN backhaul connection to provide the second LAN access device with WAN connectivity; a management device is communicatively interfaced with each of the first LAN access device, the second LAN access device, the first WAN backhaul connection, and the second WAN backhaul connection; and the management device routes a first portion of traffic originating from the first LAN over the first WAN backhaul connection and routes a second portion of the traffic originating from the first LAN over the second WAN backhaul connection.

In another embodiment, a first Local Area Network (LAN) access device is to establish a first LAN; a second LAN access device is to establish a second LAN; a first Wide Area Network (WAN) backhaul connection is to provide the first LAN access device with WAN connectivity; a second WAN backhaul connection is to provide the second LAN access device with WAN connectivity; a management device is communicatively interfaced with each of the first LAN access device, the second LAN access device, the first WAN backhaul connection, and the second WAN backhaul connection; and the management device, responsive to a failure event, re-routes traffic associated with the first LAN onto the second WAN backhaul connection or re-routes traffic associated with the second LAN onto the first WAN backhaul connection.

In accordance with embodiments described herein, end-user consumers, including residential consumers and business consumers, may connect to the Internet by way of a Wide Area Network (WAN) backhaul connection to a Service Provider (SP), such as an Internet Service Provider (ISP), or to a Service Provider that provides one or more of data connectivity, voice connectivity, video connectivity, and mobile device connectivity to a plurality of subscribers. Such Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs which provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as wireless (e.g., WiFi) connectivity at hotspots, or mobile data connectivity via technologies and standards such as WiMax, 3G/4G, LTE, etc.

At an end-user's premises, Internet bandwidth and other compatible services provided via a WAN backhaul connection to an ISP is commonly distributed amongst multiple devices within the end-user's premises via a Local Area Network (LAN), which may be established via a LAN device. Distribution of the Internet Bandwidth and other services provided via the WAN backhaul may further extend to an area around an end-user's premises, such as to an area outside a home, to a space or area outside of or around a business in which the Internet Bandwidth is accessible via the end-user's LAN wirelessly. At the end-user's premises, network traffic may be distributed within the LAN via wired connections or wireless connections, for example, over coaxial wiring, electrical power wiring, twisted-pair telephone wiring, variants of Ethernet/Category-5 type wiring, and various types of wireless radio signals using licensed and unlicensed spectrum and various protocols. In accordance with one embodiment, access to Internet bandwidth and other services provided by the WAN backhaul may be secured.

Some network traffic associated with the end-user's premises remains local to the LAN, while other traffic destined for locations external to the LAN traverse the LAN onto the WAN interface and onto the Internet via the WAN backhaul.

Besides network traffic traversing the WAN and LAN networks and interfaces, various types of information is available, retrievable, or observable from each of the distinct WAN and LAN networks. The management device described herein may collect information collected from the WAN and LAN networks via respective WAN and LAN interfaces to such networks, and perform or enable various enhancements, such as performing self-healing operations utilizing multiple WAN backhauls serving multiple distinct LAN networks; and load balancing traffic utilizing multiple WAN backhauls serving multiple distinct LAN networks. The management device may further coordinate or instruct the formation of a logical WAN backhaul connection over multiple underlying physical or wireless WAN backhauls. Some embodiments make use of a traffic aggregation unit which may form a logically bonded WAN interface from two or more underlying WAN interfaces. In some embodiments, a traffic de-aggregation unit may optionally be employed. Traffic aggregation may use inverse multiplexing, Ethernet switching, IP routing, Asynchronous Transfer Mode (ATM), Time-Division Multiplexing (TDM), Point-to-Point Protocol (PPP), PPP Multi-Link Protocol (MLPPP), or other technologies.

An alternative to classic traffic aggregation is to selectively aggregate traffic by switching or routing physically or logically distinct traffic sources and sinks over different connections. For example, traffic from a first subnet on a LAN can travel over a first WAN connection, while traffic from a second subnet on a LAN can travel over a second WAN connection. This selective aggregation mechanism can switch or route traffic according to physical port, priority level, Ethernet VLAN or MAC identities, IP number, subnet, TCP/UDP port number, protocol, type of service (TOS), DiffSery Code Point (DSCP), IP precedence, MPLS tag, application layer, etc.

Aggregation via selectively switching or routing traffic may be performed with no physical aggregation element, for example, an aggregation element may be either physical entity or a logically defined entity in accordance with the various described embodiments.

Aggregation and selection of connections may be varied adaptively, as traffic demands and connection bandwidths change over time. For example, a high traffic demand from a first LAN may be routed over both a first and a second WAN, but when the traffic demand from the first LAN decreases the traffic ceases to be routed over the second WAN. If traffic demand increases on the second LAN such traffic may then be routed over the first WAN. More involved real-time load balancing may be incorporated to match overall traffic demands with bandwidth supply in an adaptive fashion.

Disclosed embodiments may also be extended to cases with more than two LANs or more than two WAN connections. In such cases, traffic aggregation schemes have multiple traffic inputs and multiple choices on how to aggregate traffic, for example, over a single connection or multiple connections each with its own link quality, capacity. Since there is interdependency between the performances of traffic aggregation schemes and input flow characteristics and link quality, traffic can be aggregated taking a weighted approach to better serve the scenario at hand. Traffic can be weighted to account for the fact that not all access point conditions are equal, therefore when connections are made to more than two access points, the connections to different access points may be weighted accordingly, for example, to compensate for the different speeds, throughput, latency, or other characteristics associated with the distinct access points. In one embodiment, weighting is dependent upon the supply of bandwidth on the different WAN connections, and further dependent upon the traffic demand from the different LANs. The weighting may further vary with the type or priority of traffic, different service levels, different services, etc. The weighting may also be time varying as a consequence of the fact that channel quality also changes over time. This applies also the LAN case where it is well known that in-home power line communications (PLC) faces time varying impairments.

Disclosed embodiments may also be extended to cases where the same LAN extends over multiple physically separated channels. For example, such as the case of having a LAN where G.hn (ITU-T standardized unified high-speed wire-line based home networking) nodes operate over phoneline, power lines, and coax; or in the case of a hybrid wireline/wireless LAN. In cases, traffic aggregation over the WAN may apply different weights on input flows originating on coax or phoneline or power line or wireless. Similarly, when one source requires so many channel resources that no single physical channel is able to satisfy them, then traffic handling schemes may split the input traffic and simultaneously transmit the input traffic over multiple channels. This can be accomplished using possibly unequal weights depending on link conditions and then re-aggregate the input traffic over the WAN or eventually at the sink within the LAN. The way in which incoming traffic is simultaneously transmitted over multiple channels can change over time with link condition and traffic requirements.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a Management Device, a traffic aggregation unit, and/or a traffic de-aggregator to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

In performing the disclosed functions, systems may utilize a variety of operational data (which includes performance data) that is available at an Access Node (AN).

In FIG. 1, users terminal equipment 102 (e.g., a Customer Premises Equipment (CPE) device or a remote terminal device, network node, LAN device, etc.) is coupled to a home network 104, which in turn is coupled to a Network Termination (NT) Unit 108. DSL Transceiver Units (TU) are further depicted (e.g., a device that provides modulation on a DSL loop or line). In one embodiment, NT unit 108 includes a TU-R (TU Remote), 122 (for example, a transceiver defined by one of the ADSL or VDSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements. In one embodiment, Network Termination Unit 108 is communicably interfaced with a management device 170 as described herein. In another embodiment, TU-R 122 is communicably interfaced with management device 170.

Each TU-R 122 in a system may be coupled with an TU-C (TU Central) in a Central Office (CO) or other central location. TU-C 142 is located at an Access Node (AN) 114 in Central Office 146. A Management Entity 144 likewise maintains an MIB of operational data pertaining to TU-C 142. The Access Node 114 may be coupled to a broadband network 106 or other network, as will be appreciated by those skilled in the art. TU-R 122 and TU-C 142 are coupled together by a loop 112, which in the case of ADSL may be a twisted pair line, such as a telephone line, which may carry other communication services besides DSL based communications. Either management entity 124 or management entity 144 may implement and incorporate a management device 170 as described herein. Management entity 124 or management entity 144 may further store collected WAN information and collected LAN information within an associated MIB.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from TU-C 142, while far-end parameters from TU-R 122 may be derived by either of two interfaces over the UA interface. Indicator bits and EOC messages may be sent using embedded channel 132 and provided at the Physical Medium Dependent (PMD) layer, and may be used to generate the required TU-R 122 parameters in ME 144. Alternately, the operations, Administration and Maintenance (OAM) channel and a suitable protocol may be used to retrieve the parameters from TU-R 122 when requested by Management Entity 144. Similarly, the far-end parameters from TU-C 142 may be derived by either of two interfaces over the U-interface. Indicator bits and EOC message provided at the PMD layer may be used to generate the required TU-C 142 parameters in Management Entity 124 of NT unit 108. Alternately, the OAM channel and a suitable protocol may be used to retrieve the parameters from TU-C 142 when requested by Management Entity 124.

At the U interface (also referred to as loop 112), there are two management interfaces, one at TU-C 142 (the U-C interface 157) and one at TU-R 122 (the U-R interface 158). Interface 157 provides TU-C near-end parameters for TU-R 122 to retrieve over the U interface/loop 112. Similarly, U-R interface 158 provides TU-R near-end parameters for TU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, TU-C and TU-R pairs may use it for transporting physical layer OAM messages. Thus, the TU transceivers 122 and 142 of such a system share various operational data maintained in their respective MIB s.

Depicted within FIG. 1 is management device 170 operating at various optional locations in accordance with several alternative embodiments. For example, management device 170 is located within home network 104, such as within a LAN. In an alternative embodiment, management device 170 is located at central office 146 and interfaced to home network 104 (e.g., a LAN) and broadband network 106 (e.g., a WAN) via NMS 116. In yet another embodiment, management device 170 operates on the broadband network 106 (e.g., on the WAN or Internet).

Also depicted within FIG. 1 is a traffic aggregation unit 180 operating at various optional locations in accordance with several embodiments. For example, traffic aggregation unit 180 may reside within TE 102, may reside within a LAN device 103 which is connected with TE 102, traffic aggregation unit 180 may recite on the loop 112 at the CPE or CO side. As depicted here, traffic aggregation unit 180 is placed on the loop 112 at NT 108. These and other examples and their benefits and function will be described in further detail below.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/ Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.994.1 (G.hs) for modems implementing handshake, and/ or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/ Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

FIG. 2A illustrates an alternative exemplary architecture 200 in which embodiments may operate. FIG. 2A depicts a first Wide Area Network (WAN) at element 205A, a second WAN 205B, a first Local Area Network (LAN) at element 210A, and a second LAN 210B. LAN access device 220A connects LAN 210A with WAN 205A through traffic aggregation unit 225. LAN 210B is connected with WAN 205B through LAN access device 220B. LAN access device 230 provides a communications interface between traffic aggregation unit 225 and LAN access device 220B.

In the series of exemplary embodiments set forth at FIGS. 2A through 2H there are two LAN access devices shown (e.g., 220A and 220B of FIG. 2A). However, more than two LAN access devices may permissible operate in accordance with the described embodiments and the depiction of two such LAN access devices in the exemplary figures is not to be construed as being limited to only two.

In accordance with one embodiment, such an architecture 200 or system includes a first Local Area Network (LAN) access device 220A to establish a first LAN 210A and a second LAN access device 220B to establish a second LAN 210B which is operationally distinct from the first LAN 210A. In such an embodiment, the architecture 200 or system further includes a first Wide Area Network (WAN) backhaul connection 211 to provide the first LAN access device 220A with WAN connectivity. In this embodiment, the architecture 200 or system further includes a second WAN backhaul connection 212 to provide the second LAN access device 210A with WAN connectivity. In this embodiment, each of the first WAN backhaul connection 211 and the second WAN backhaul connection 212 are physically distinct. The architecture 200 or system of this embodiment further includes traffic aggregation unit 225 to form a logically bonded WAN interface 213 over the first WAN backhaul connection 211 and the second WAN backhaul connection 212.

In one embodiment, the logically bonded WAN interface 213 provides the first LAN access device 220A and the second LAN access device 220B with WAN connectivity via a combination of first bandwidth accessible via the first WAN backhaul connection 211 and second bandwidth accessible via the second WAN backhaul connection 212.

In one embodiment, the logically bonded WAN interface 213 provides the first LAN access device 220A with WAN connectivity and further provides the second LAN access device 220B with WAN connectivity. In such an embodiment, the logically bonded WAN interface 213 supplants (e.g., is used in place of, replaces, supersedes, etc.) the first WAN backhaul connection 211 for providing the first LAN access device 220A with its respective WAN connectivity and further supplants the second WAN backhaul connection 212 for providing the second LAN access device 220B with its respective WAN connectivity. For example, in such an embodiment, both LAN access devices 220A-B communicate via logically bonded WAN interface 213 once established, rather than their respective WAN interfaces 211 and 212 respectively.

In one embodiment, the first WAN backhaul connection 211 provides the first LAN access device 220A with WAN connectivity via the first WAN backhaul connection 211 to a Service Provider that provides one or more of data connectivity, voice connectivity, video connectivity, and mobile device connectivity to a plurality of subscribers. In one embodiment, the second WAN backhaul connection 212 provides the second LAN access device 220B with WAN connectivity via the second WAN backhaul connection 212 to the same Service Provider via a physically distinct communications link to the same Service Provider. For example, WAN backhaul connections 211 and 212 may represent physically distinct communications links, yet both communicably link to the same service provider. Such a service provider may implement or establish the Wide Area Networks 205A-B.

In one embodiment, the physically distinct communications link to the same Service Provider associated with the second WAN backhaul connection is identified by an Internet Protocol (IP) address distinct from an IP address for the first WAN backhaul connection. In such an embodiment, the physically distinct communications link to the same Service Provider associated with the second WAN backhaul connection 212 is associated with a subscriber's account distinct from a subscriber's account associated with the first WAN backhaul connection 211. For example, the first WAN backhaul connection 211 may lead to one house or office, and the second WAN backhaul connection 212 may lead to a separate and distinct house or office. Nevertheless, both may trace back to the same service provider.

In one embodiment, the first WAN backhaul connection 211 provides the first LAN access device 220A with WAN connectivity via the first WAN backhaul connection 211 to a first Service Provider that provides one or more of data connectivity, voice connectivity, video connectivity, and mobile device connectivity to a plurality of subscribers and the second WAN backhaul connection 212 provides the second LAN access device 220B with WAN connectivity via the second WAN backhaul connection 212 to a second Service Provider separate and distinct from the first Service Provider. For example, different from the preceding example, each of the first and second WAN backhaul connections 211 and 212 may lead to completely different service providers.

In one embodiment, at least a portion of traffic originating from the first LAN 210A and at least a portion of traffic originating from the second LAN 210B traverses the logically bonded WAN interface 213.

In one embodiment: (a) a first plurality of traffic packets originating from the first LAN 210A traverses the logically bonded WAN interface 213 via the first WAN backhaul 211 through the traffic aggregation unit 225; (b) a second plurality of traffic packets originating from the first LAN 210A traverses the logically bonded WAN interface 213 via the second WAN backhaul 212 through the traffic aggregation unit 225; (c) a third plurality of traffic packets originating from the second LAN 210B traverses the logically bonded WAN interface 213 via the first WAN backhaul 211 through the traffic aggregation unit 225; and (d) a fourth plurality of traffic packets originating from the second LAN 210B traverses the logically bonded WAN interface 213 via the second WAN backhaul 212 through the traffic aggregation unit 225. Thus, packets originating from either LAN 210A-B may traverse the logically bonded WAN interface 213 via either or both underlying WAN backhaul connection 211 and/or 212. In such an embodiment, LAN devices within either LAN 210A-B may operate wholly agnostic or ignorant of which underlying backhaul connection is being utilized for any given packet, as the traffic aggregation unit 225 provides the necessary coordination for the plurality of packets sent to, or designated for, various locations accessible within the WANs 205A-B (e.g., such as packets which must be routed to a location over the Internet, etc.).

In one embodiment, the first LAN 210A includes a first plurality of interconnected LAN nodes 238. In such an embodiment, each of the first plurality of interconnected LAN nodes 238 are identifiable within the first LAN 210A by a private Internet Protocol (IP) address managed by the first LAN access device 220A. In such an embodiment, the second LAN 210B includes a second plurality of interconnected LAN nodes 239, in which each of the second plurality of interconnected LAN nodes 239 are identifiable within the second LAN 210B by a private IP address managed by the second LAN access device 220B. In such an embodiment, the first LAN access device 220A is identifiable via a first unique Public IP address assigned to the first LAN access device 220A and the second LAN access device 220B is identifiable via a second unique Public IP address assigned to the second LAN access device 220B.

The LAN nodes 238 and 239 may associate with the LAN access devices 220A and 220B, respectively according to their respective selection criteria. For example, LAN nodes 238 and 239 might associate with the LAN access device with the highest received power as indicated for example by RSSI (Received Signal Strength Indication). Alternatively, nodes might associate with LAN access devices based on the bandwidth that the LAN access devices can service the respective LAN node with, after servicing existing nodes. The WAN backhaul capacity of a LAN access device might also be taken into account to make this choice or selection. Another selection criterion might be that a LAN node associates with the LAN access device servicing fewer existing nodes. In other cases, the security requirements to associate with a LAN access device might leave the node with only one LAN access device to associate with.

For example, each of the unique Public IP addresses may be assigned by an ISP or service provider which provides internet connectivity to the respective LAN access devices 220A-B. Thus, in accordance with one embodiment, each of the first and second unique Public IP address are directly addressable via a public Internet. In one embodiment, the private Internet Protocol (IP) addresses managed by the LAN access device 220A-B are not directly addressable via the Internet, but instead, must rely upon Network Address Translation (NAT) or some forwarding mechanism, for example, a forwarding mechanism provided by a modem, a router, etc. Thus, in accordance with one embodiment, none of the first or second plurality of interconnected LAN nodes 238 and 239 are directly addressable via the public Internet as each of the first or second plurality of interconnected LAN nodes 238 and 239 require address translation to a corresponding private IP address associated with the respective one of the first or second plurality of interconnected LAN nodes 238 and 239 to receive traffic from the public Internet. For example, the LAN access devices may be Internet facing, whereas the interconnected LAN nodes 238 and 239 are not, and are thus protected to some extent as traffic must first traverse at least the LAN access device before any of the plurality of interconnected LAN nodes 238 and 239 can be accessed.

In an alternative embodiment, the first LAN 210A includes a first plurality of interconnected LAN nodes 238, each of which are identifiable within the first LAN 210A by one or more Virtual Local Area Network (VLAN) tags managed by the first LAN access device 220A and the second LAN 210B includes a second plurality of interconnected LAN nodes 239, each of which are identifiable within the second LAN 210B by a second one or more VLAN tags which are managed by the second LAN access device 220B. In such an alternative embodiment, the first LAN access device 220A provides Voice over Internet Protocol (VoIP) services and/or Internet Protocol Television (IPTV) services to one or more of the interconnected LAN nodes 238 within the first LAN 220A based on Ethernet level addressing using the one or more VLAN tags and the second LAN access device 220B provides VoIP services and/or IPTV services to one or more of the interconnected LAN nodes 239 within the second LAN 210B based on Ethernet level addressing using the second one or more VLAN tags. In this embodiment, any of the first and second plurality of interconnected LAN nodes 238 and 239 may be uniquely identifiable based at least on the one or more VLAN tags respectively managed by the first or second LAN access device 220A-B. For example, the units may be addressable over the Internet via remote devices using the one or more VLAN tags.

In accordance with one embodiment, the traffic aggregation unit 225 includes or is allocated or assigned a Public Internet Protocol (IP) address distinct from a public IP address associated with the first LAN access device 220A and distinct from a public IP address associated with the second LAN access device 220B. Thus, it is distinctly, uniquely, and separately identifiable and addressable, separately from either of the LAN access devices 220A-B.

In one embodiment, the first WAN backhaul connection 211 includes or corresponds to a first transfer rate with the first LAN 210A and the second WAN backhaul connection 212 includes or corresponds to a second average transfer rate with the second LAN 210B. In such embodiments, the bonded WAN interface 213 includes or corresponds to an aggregate transfer rate with the first LAN 210A and with the second LAN 210B which is greater than the first transfer rate and is greater than the second transfer rate of the first and second WAN backhaul connections 211 and 212 respectively. Thus, a client device within one of the LANs 210A-B, such as one of the LAN nodes 238, may attain greater transfer rates using the logically bonded WAN interface 213 than would be possible using only one of the underlying first or second WAN backhaul connections 211 and 212. For example, the first and second transfer rates may constitute one of an instantaneous data rate, an average peak data rate, or a peak transfer rate, and further in which the aggregate transfer rate results in data throughput capability which is greater than either of the first or the second respective transfer rates individually.

In accordance with one embodiment, the traffic aggregation unit 225 operates physically separate and distinct from each of the first LAN access device 220A and the second LAN access device 220B. In such an embodiment, the traffic aggregation unit 225 is communicatively interfaced between the first LAN access device 220A and the first WAN backhaul connection 211, in which the traffic aggregation unit has a direct communications link to each of the first LAN access device 220A and the first WAN backhaul connection 211. In such an embodiment, the traffic aggregation unit 225 is further communicatively interfaced with the second LAN access device 220B, in which the traffic aggregation unit 225 has an indirect communications link to the second WAN backhaul connection 212 through the second LAN access device 220B which operates in direct communication with the second WAN backhaul connection 212. For example, the direct communications link communicably interfacing the traffic aggregation unit 225 between the first LAN access device 220A and the first WAN backhaul connection 211 may constitute a communications link with no other intermediate nodes, whereas the indirect communication link to the second WAN backhaul connection 212 includes at least one intermediate node before the indirect connection reaches the second WAN backhaul connection 212.

As depicted, LAN access device 230 is an intermediate node. LAN access device 220B may also serve as an intermediate node as the depicted route traverses the second LAN access device 220B to reach the second WAN backhaul connection 212. Thus, in accordance with an alternative embodiment, the system or architecture 200 further includes a third LAN access device 230 which is communicatively interfaced between the traffic aggregation unit 225 and the second LAN access device 220B. In such an embodiment, the third LAN access device 230 has a direct communications link to each of the traffic aggregation unit 225 and the second LAN access device 220B. In this alternative embodiment, the traffic aggregation unit 225 has an indirect communications link to the second LAN access device 220B through the third LAN access device 230, in which the third LAN access device 230 provides an alternate backup communications path to the logically bonded WAN interface 213 over the first WAN backhaul connection 211 and the second WAN backhaul connection 212 responsive to a failure event at one of the first LAN access device 220A or the second LAN access device 220B.

FIG. 2B illustrates an alternative exemplary architecture 201 in which embodiments may operate. FIG. 2B additionally introduces traffic de-aggregator unit 235.

In accordance with one embodiment, such an architecture 201 or system further includes a traffic de-aggregator unit 235 communicatively interfaced between the first WAN backhaul connection 211 and the second WAN backhaul connection 212. In such an embodiment, the traffic aggregation unit 225 (forming the logically bonded WAN interface 213) bonds Internet Protocol (IP) addresses associated with traffic originating from both the first LAN 210A and the second LAN 210B. In such an embodiment, the traffic aggregation unit 225 further routes the traffic having the bonded IP addresses through the traffic de-aggregator unit 235.

In accordance with one embodiment, the traffic de-aggregator unit 235 is managed by a Service Provider that provides one or more of data connectivity, voice connectivity, video connectivity, and mobile device connectivity to a plurality of subscribers via the first and second WAN backhaul connections 211 and 212. In such an embodiment, the traffic de-aggregator unit 235 operates physically separate and distinct from each of the first LAN access device 220A, the second LAN access device 220B, the third LAN access device 230, and the traffic aggregation unit 225.

FIG. 2C illustrates an alternative exemplary architecture 202 in which embodiments may operate. FIG. 2C introduces the traffic aggregation unit 225 as an integrated sub-component of a LAN access device 220A.

In accordance with one embodiment, the traffic aggregation unit 225 operates as an integrated sub-component of the first LAN access device 220A, in which the first LAN access device 220A operates physically separate and distinct from the second LAN access device 220B. In such an embodiment, the traffic aggregation unit 225 is communicatively interfaced with the first WAN backhaul connection 211 via a communications interface of the first LAN access device 220A (e.g., internal circuitry of 220A, etc.). In such an embodiment, the traffic aggregation unit 225 is communicatively interfaced with the second LAN access device 220B, in which the traffic aggregation unit 225 uses an indirect communications link to the second WAN backhaul connection 212 through the second LAN access device 220B which operates in direct communication with the second WAN backhaul connection 212.

FIG. 2D illustrates an alternative exemplary architecture 203 in which embodiments may operate. FIG. 2D introduces the traffic aggregation unit 225 as an integrated sub-component of a LAN access device 220A in communication with a traffic de-aggregator unit 235.

In one embodiment, the described architecture 203 or system includes a traffic de-aggregator unit 235 which is communicatively interfaced between the first WAN backhaul connection 211 and the second WAN backhaul connection 212, in which the traffic aggregation unit 225 forms a logically bonded WAN interface 213 over the first WAN backhaul 211 and the second WAN backhaul 212 by bonding Internet Protocol (IP) addresses associated with traffic originating from the first LAN 210A and the second LAN 210B and by further routing the traffic having the bonded IP addresses through the traffic de-aggregator unit 235. In accordance with one embodiment, the first WAN 205A and the second WAN 205B and the corresponding first WAN backhaul connection 211 and second WAN backhaul connection 212 form an aggregation network via the traffic de-aggregator 235, the traffic de-aggregator 235 being connected with Internet WAN 299 as shown.

FIG. 2E illustrates an alternative exemplary architecture 204 in which embodiments may operate. FIG. 2E introduces LAN devices 240 having one or more wireless transceiver 241 (e.g., each with one or more antennas) to establish one or more wireless communication paths 242A and 242B. Wireless coverage areas 243 are further depicted as are wireless transceivers 244A and 244B at the LAN access devices 220A-B.

In one embodiment, at least one of a plurality of LAN devices 240 operating within the first LAN 210A use a first communication path to the first WAN backhaul connection 211 through the first LAN access device 220A and in such an embodiment, at least one of a plurality of LAN devices 240 operating within the first LAN 210A also use a second communication path to the second WAN backhaul connection 212 through the second LAN access device 220B. In such an embodiment, at least one LAN device 240 includes at least one of: a multiplexing wireless transceiver 241 capable to simultaneously maintain a first wireless communication path 242A to the first LAN access device 220A and a second wireless communication path 242B to the second LAN access device 220B by multiplexing between the first and second wireless communication paths 242A-B respectively; a wireless transceiver 241 capable to establish the first wireless communication path 242A to the first LAN access device 220A and capable to establish the wireless second communication path 242B to the second LAN access device 220B by terminating the first wireless communication path 242A and switching to the second wireless communication path 242B; and a first wireless transceiver 241 and a second wireless transceiver 241, the first and second wireless transceivers 241 capable to establish the first wireless communication path 242A to the first LAN access device 220A and capable to establish the wireless second communication path 242B to the second LAN access device 220B either concurrently or not concurrently with the first wireless communication path 242A to the first LAN access device 220A.

In one embodiment, the first LAN access 220A device is within a residential premises common to the at least one of a plurality of LAN devices 240 operating within the first LAN 210A and the second LAN access device 220B is within a second residential premises in a neighboring vicinity to the first residential premises. In such an embodiment, a wireless coverage area 243 associated with the second LAN access device 220B overlaps with the first residential premises and the at least one of a plurality of LAN devices 240 operating within the first LAN 210A. In such an embodiment, the at least one of a plurality of LAN devices 240 operating within the first LAN 210A establishes connectivity with the second WAN backhaul connection 212 through the second LAN access device 220B responsive to a failure event associated with the first LAN access device 220A.

In one embodiment, at least one of a plurality of LAN devices 240 operating within the first LAN 210A, responsive to a failure event associated with the first LAN access device 220A, establishes connectivity to the second WAN backhaul connection 212 via a wireless connection path 242B between an transceiver 241 of the at least one of the plurality of LAN devices 240 within the first plurality of LAN devices 240 and an transceiver 244B of the second LAN access device 220B which is external to, and operationally distinct from, the first LAN access device 220A. In such an embodiment, the failure event corresponds to a hard failure event characterized by a total loss of connectivity between the first LAN access device 220A and the corresponding first WAN backhaul connection 211 or a soft failure event characterized by degraded connectivity, based on a threshold, between the first LAN access device 220A and the corresponding first WAN backhaul connection 211.

In one embodiment, the wireless connection between the transceiver 241 of at least one of the plurality of LAN devices 240 within the first LAN 210A and the transceiver 244B of the second LAN access device 220B constitutes at least one of the plurality of LAN devices 240 connecting with the second LAN access device 220B using a guest SSID (Service Set Identification) on the second LAN access device 220B. In a particular embodiment, the guest SSID on the second LAN access device 220B enables guest devices (e.g., such as one of LAN devices 240 from the distinct LAN 210A) to communicate with the second WAN backhaul connection 212 through the second LAN access device 220B. In such an embodiment, the guest SSID on the second LAN access device 220B further restricts the guest devices from communicating with any devices operating within the second LAN 210B without first traversing the second WAN backhaul connection 212. For example, despite such devices within the second LAN 210B being immediately networked to the same LAN access device 220B, the guest devices must nevertheless communicate through the WAN 205A-B, for example, by establishing communication via the Internet, as if the guest devices were still connected to their originating LAN access device 220A. In so doing, security can be maintained for the secondary network infrastructure while allowing the guest devices to utilize the second WAN backhaul 212 resource.

FIG. 2F illustrates an alternative exemplary architecture 206 in which embodiments may operate. FIG. 2F introduces a traffic aggregation unit 225 as an integrated sub-component within one of a plurality of LAN devices 240A.

In accordance with one embodiment, the traffic aggregation unit 225 operates as an integrated sub-component within one of a plurality of LAN devices 240A operating within the first LAN 210A. In such an embodiment, the traffic aggregation unit 225 is communicatively interfaced with the first WAN backhaul connection 211 via a communications path to the first LAN access device 220A which in turn is interfaced via a communications path to the first WAN backhaul connection 211. In this embodiment, the traffic aggregation unit 225, integrated as a sub-component within the one of the plurality of LAN devices 240A operating within the first LAN 210A, further is communicatively interfaced with the second LAN access device 220B, in which the traffic aggregation unit 225 uses an indirect communications link to the second WAN backhaul connection 212 through the second LAN access device 220B which operates in direct communication with the second WAN backhaul connection 212.

In one embodiment, the traffic aggregation unit 225 communicates with the first LAN access device 220A through a wireless communication path 242A from the one of the plurality of LAN devices 240A to the first LAN access device 220A and further wherein the traffic aggregation unit 225 communicates with the second LAN access device 220B through a second wireless communication path 242B from the one of the plurality of LAN devices 240A to the second LAN access device 220B.

In one embodiment, the first and second wireless communication paths 242A-B from the one of the plurality of LAN devices 240A to the first and second LAN access devices 220A-B respectively, include at least one of: wireless connectivity via a multiplexing wireless transceiver 241 that simultaneously maintains the first wireless communication path 242A to the first LAN access device 220A and the second wireless communication path 242B to the second LAN access device 220B by multiplexing between the first and second wireless communication paths 242A-B respectively; wireless connectivity via a wireless transceiver 241 capable to establish the first wireless communication path 242A to the first LAN access device 220A and capable to establish the wireless second communication path 242B to the second LAN access device 220B by terminating the first wireless communication path 242A and switching to the second wireless communication path 242A; and wireless connectivity via a first wireless transceiver 241 and a second wireless transceiver 241, the first and second wireless transceivers 241 capable to establish the first wireless communication path 242A to the first LAN access device 220A and capable to establish the wireless second communication path 242B to the second LAN access device 220B, either concurrently or not concurrently, with the first wireless communication path 242A to the first LAN access device 220A.

FIG. 2G illustrates an alternative exemplary architecture 207 in which embodiments may operate. FIG. 2G re-introduces the traffic de-aggregator unit 235.

In one embodiment, the architecture 207 or system further includes a traffic de-aggregator unit 235 communicatively interfaced between the first WAN backhaul connection 211 and the second WAN backhaul connection 212, in which the traffic aggregation unit 225 (which is integrated as a sub-component of one of the LAN devices 240A) forms a logically bonded WAN interface 213 over the first WAN backhaul connection 211 and the second WAN backhaul connection 212 by bonding Internet Protocol (IP) addresses associated with traffic originating from both the first LAN 210A and the second LAN 210B and further by routing the traffic having the bonded IP addresses through the traffic de-aggregator unit 235. The traffic de-aggregator may be managed by a Service Provider that provides one or more of data connectivity, voice connectivity, video connectivity, and mobile device connectivity to a plurality of subscribers via the first and second WAN backhaul connections. The traffic de-aggregator unit 235 may be physically separate and distinct from each of the first LAN access device 220A, the second LAN access device 220B, a third LAN access device 230 (if one is present), and the traffic aggregation unit 225.

In accordance with the various embodiments described herein, each of the first WAN backhaul connection 211 and the second WAN backhaul connection 212 are selected from the group of WAN backhaul connections which includes: a broadband connection; a Digital Subscriber Line (DSL) connection; a cable connection; a femtocell connection; a mobile connection; a fiber connection; a wireless connection; and an access Broadband over Power Line (BPL) connection.

In accordance with the various embodiments described herein, each of the first and second LANs 210A and 210B include at least a user device. In accordance with the disclosed embodiments, each of the first and second LAN access devices 220A-B communicably link each of the respective user devices with one of the first WAN backhaul connection 211 or the second WAN backhaul connection 212. For example, any one of the interconnected LAN nodes 238 and 239 or the LAN devices 240 from FIG. 2E, 240A and 240B may be a user device.

In accordance with the various embodiments described herein, each of the first LAN 210A and the second LAN 210B include a plurality of interconnected LAN nodes 238 and 239. In such an embodiment, each of the plurality of interconnected LAN nodes 238 and 239 communicate via at least one of: an Ethernet based network connection; a wireless based network connection; an Institute of Electrical and Electronics Engineers (IEEE) 802.11 standards based network connection; an 802.11a, 802.11b, 802.11g, and/or 802.11n wireless compatible network connection; a femto network connection transmitting via a mobile cellular compatible protocol including at least one of a third generation (3G) compatible protocol, a fourth generation (4G) compatible protocol, and a Long Term Evolution (LTE) compatible protocol; a power line connection; a telephone system connection; a Plain Old Telephone Service (POTS) connection; a G.hn (ITU-T standardized unified high-speed wireline based home networking) connection; and a Coax cable connection.

In accordance with the various embodiments described herein, each of the first LAN access device 220A and the second LAN access device 220B are selected from the group of access devices which includes: a base station; an access point; a modem; a router; a gateway; a Digital Subscriber Line (DSL) Customer Premises Equipment (CPE) modem; an in-home power line device; a Home Phoneline Network Alliance (HPNA) based device; an in-home coax distribution device; a G.hn compatible device; an in-home metering communication device; an in-home appliance communicatively interfaced with the LAN; a wireless femtocell base station; a wireless compatible base station; a wireless mobile device repeater; a wireless mobile device base station; a set-top box (STB)/set-top unit (STU) customer electronics device; an Internet Protocol (IP) enabled television; an IP enabled media player; an IP enabled gaming console; an Ethernet gateway; a computing device connected to the LAN; a HomePlug device; an IEEE P1901 standards compatible access Broadband over Power Line (BPL) device; an Ethernet connected computer peripheral device; an Ethernet connected router; an Ethernet connected wireless bridge; an Ethernet connected network bridge; and an Ethernet connected network switch.

FIG. 2H illustrates an alternative exemplary architecture 208 in which embodiments may operate. FIG. 2H introduces a traffic aggregation unit 225 as an integrated sub-component within one a third LAN access device 230.

In one embodiment, the architecture 208 or system further includes a third LAN access device 230 which is communicably interfaced between the first LAN access device 220A and the second LAN access device 220B. In such an embodiment the traffic aggregation unit 225 operates as an integrated sub-component of the third LAN access device 230, in which the third LAN access device 230 operates physically separate and distinct from each of the first LAN access device 220A and the second LAN access device 220B.

In one embodiment, the traffic aggregation unit uses a first connection, via a device communicably interfaced with the second LAN access device 220B and uses a second connection to communicably interface the traffic aggregation unit 225 with the first WAN backhaul connection 211. In such an embodiment, a data aggregation unit 231 combines traffic from the first connection and traffic from the second connection into aggregated traffic.

In one embodiment, a data de-aggregation unit 236 is communicably interfaced with the first WAN backhaul connection 211 and communicably interfaced with the second WAN backhaul connection 212. In such an embodiment, the data de-aggregation unit 236 de-aggregates traffic onto the first connection and onto the second connection as de-aggregated traffic.

FIG. 3A illustrates an alternative exemplary architecture 300 in which embodiments may operate. Depicted are a first Wide Area Network (WAN) at element 305A and a second WAN at 305B. WAN 305A being connected with Local Area Network (LAN) 310A via WAN backhaul connection 311 and WAN 305B being connected with LAN 310B via WAN backhaul connection 312.

In accordance with one embodiment, such an architecture 300 or system includes a first Local Area Network (LAN) access device 320A to establish a first LAN 310A and a second LAN access device 320B to establish a second LAN 310B which is operationally distinct from the first LAN 310A. In this embodiment, a first Wide Area Network (WAN) backhaul connection 311 provides the first LAN access device 320A with WAN connectivity and a second WAN backhaul connection 312 provides the second LAN access device 320B with WAN connectivity, in which each of the first WAN backhaul connection 311 and the second WAN backhaul connection 312 are physically distinct. This embodiment further includes a management device 325 communicatively interfaced with each of the first LAN access device 310A, the second LAN access device 310B, the first WAN backhaul connection 311, and the second WAN backhaul connection 312. In such an embodiment, the management device 325, responsive to a failure event, re-routes traffic associated with the first LAN 310A onto the second WAN backhaul connection 312 or re-routes traffic associated with the second LAN 310B onto the first WAN backhaul connection 311.

FIG. 3B illustrates an alternative exemplary architecture 301 in which embodiments may operate. In accordance with one embodiment, the management device 325 is implemented within the first LAN access device 320A and communicatively interfaced with the LAN access device 320A via an internal communications bus of the first LAN access device (e.g., via internal circuitry). In such an embodiment, the management device 325 is communicatively interfaced with each of the second LAN access device 320B, the first WAN backhaul connection 311, and the second WAN backhaul connection 312 via one or more communication paths 350 external to the first LAN access device 320A.

FIG. 3C illustrates an alternative exemplary architecture 302 in which embodiments may operate. In accordance with one embodiment, the management device 325 is implemented within a WAN access device 335A communicatively coupled with the first WAN backhaul connection 311 via an internal communications bus of the first WAN access device (e.g., via internal circuitry). In such an embodiment, the management device 325 is communicatively interfaced with each of the first LAN access device 320A, the second LAN access device 320B, and the second WAN backhaul connection 312 via one or more communication paths 350 external to the first WAN access device 335A.

Figure 3D:
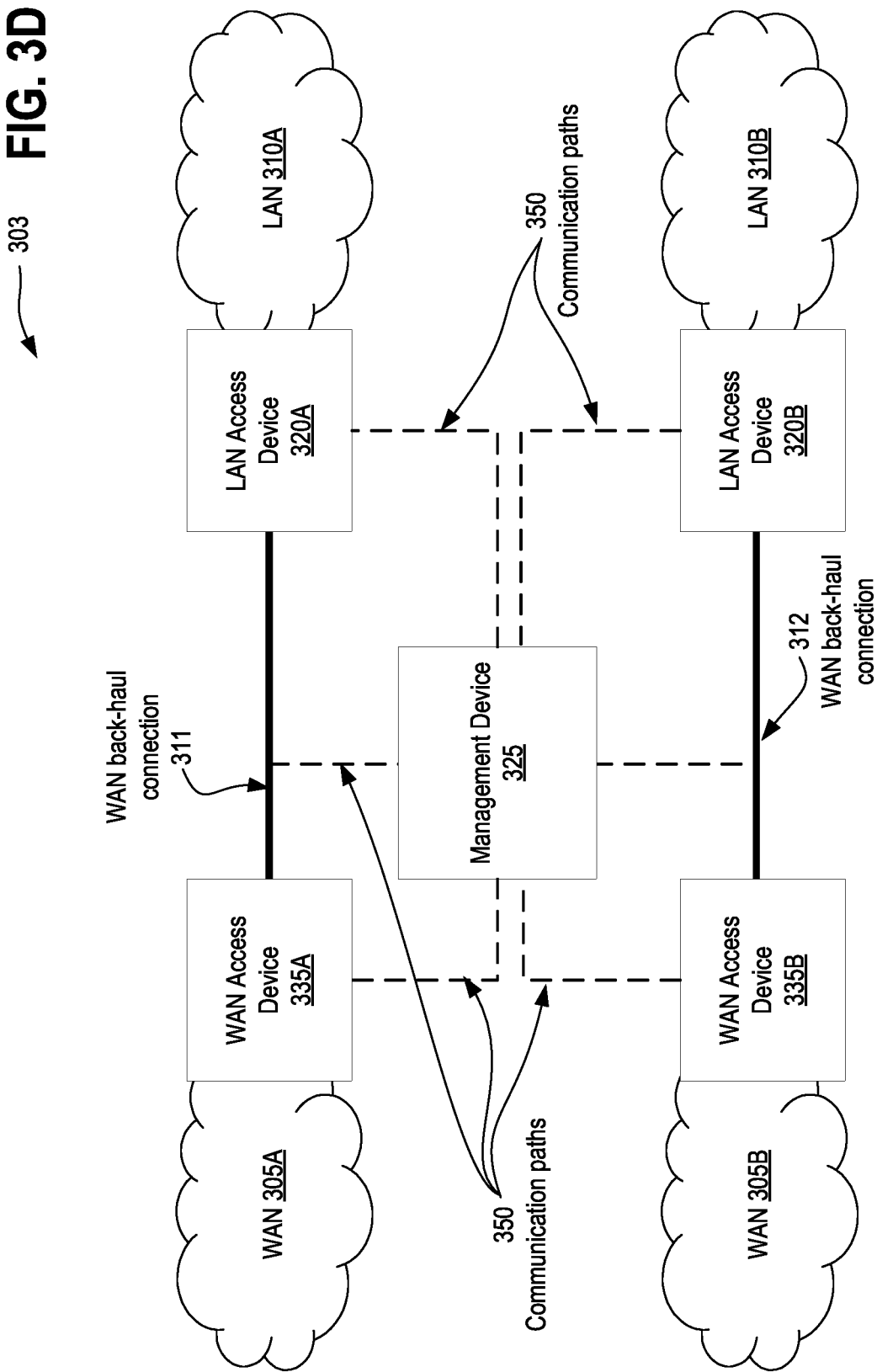

FIG. 3D illustrates an alternative exemplary architecture 303 in which embodiments may operate. In accordance with one embodiment, the management device 325 is implemented as an externally separate and physically distinct device from a first WAN access device 335A communicatively coupled with the first WAN backhaul connection 311, as an externally separate and physically distinct device from a second WAN access device 335B communicatively coupled with the second WAN backhaul connection 312, as an externally separate and physically distinct device from the first LAN access device 320A, and as an externally separate and physically distinct device from the second LAN access device 320B. In such an embodiment, the management device 325 is communicatively interfaced with each of the first WAN access device 335A, the second WAN access device 335B, the first LAN access device 320A, and the second LAN access device 320B, via one or more communication paths 350 external to the externally separate and physically distinct implementation of the management device 325.

FIG. 3E illustrates an alternative exemplary architecture 304 in which embodiments may operate. In accordance with one embodiment, such an architecture 304 or system further includes a traffic aggregation unit 345 which operates externally separate and physically distinct from each of the first LAN access device 320A and the second LAN access device 320B. In such an embodiment, the traffic aggregation unit 345 forms a logically bonded WAN interface 313 over the first WAN backhaul 311 and the second WAN backhaul 312. In accordance with this embodiment, the management device 325 is implemented within the traffic aggregation unit 345 and is communicatively interfaced with each of the first LAN access device 320A, the second LAN access device 320B, the first WAN backhaul connection 311, and the second WAN backhaul connection 312 via one or more communication paths 350 external to the traffic aggregation unit 345.

In accordance with several of the various embodiments, the traffic aggregation unit 345 or the management device 325 operates in accordance with Synchronous optical networking (SONET) or synchronous digital hierarchy (SDH) multiplexing protocols. In one embodiment, the traffic aggregation unit 345 or the management device 325, responsive to a failure event, re-routes the traffic by performing a SONET or SDH compatible rapid re-route function. In one the traffic aggregation unit 345 or the management device 325, responsive to a failure event, re-routes the traffic via an Ethernet Resilient Packet Ring (RPR) implementation.

In accordance with one embodiment, the management device 345, responsive to a failure event, re-routes the traffic by instituting one or more of the following events: (a) performing a first traffic re-route operation responsive to a hard failure event characterized by a total loss of connectivity for one of the first LAN access device 320A and the second LAN access device 320B with the corresponding first or second WAN backhaul connection 311 or 312; or (b) performing a second traffic re-route operation responsive to a soft failure event characterized by degraded connectivity as determined by a threshold for one of the first LAN access device 320A and the second LAN access device 320B with the corresponding first or second WAN backhaul connection 311 or 312. In such an embodiment, the first traffic re-route operation may be different than the second traffic re-route operation.

FIG. 4A illustrates an alternative exemplary architecture 400 in which embodiments may operate. Depicted are a first Wide Area Network (WAN) at element 405A and a second WAN at 405B. WAN 405A being connected with Local Area Network (LAN) 410A via WAN backhaul connection 411 and WAN 405B being connected with LAN 410B via WAN backhaul connection 412.

In accordance with one embodiment, such an architecture 400 or system includes a first Local Area Network (LAN) access device 420A to establish a first LAN 410A and a second LAN access device 420B to establish a second LAN 410B operationally distinct from the first LAN 410A. In such an embodiment, a first Wide Area Network (WAN) backhaul connection 411 provides the first LAN access device 420A with WAN connectivity and a second WAN backhaul connection 412 provides the second LAN access device 420B with WAN connectivity, in which each of the first WAN backhaul connection 411 and the second WAN backhaul connection 412 are physically distinct. In this embodiment, a management device 425 is communicatively interfaced with each of the first LAN access device 420A, the second LAN access device 420B, the first WAN backhaul connection 411, and the second WAN backhaul connection 412. In this embodiment, the management device 425 routes a first portion 498 of traffic originating from the first LAN 410A over the first WAN backhaul connection 411 and the management device 425 further routes a second portion 499 of the traffic originating from the first LAN 410A over the second WAN backhaul connection 412.

In one embodiment, the management device 425 routes the first portion 498 of traffic over the first WAN backhaul connection 411 and further routes the second portion 499 of the traffic over the second WAN backhaul connection 412 to implement load-balancing for the first LAN 410A.

In one embodiment, the management device 425 implements load balancing for the second LAN 410B by routing a first portion 444 of traffic originating from the second LAN 410B over the second WAN backhaul connection 412 and by further routing a second portion 445 of the traffic originating from the second LAN 410B over the first WAN backhaul connection 411. Management device 425 may implement load balancing for the respective first and/or second LANs regardless of whether the management device is internal to LAN access device 420A or 420B.

In one embodiment, the management device 425 implementing load balancing includes determining what portions of traffic 498 and 499 to route over the first and second WAN backhauls, respectively, based on factors such as bandwidth capacity of the first and second WAN backhauls, or based on other factors such as payment options chosen by the first and second subscribers, or conditions imposed by their internet service providers, based on a number of nodes associated with each of the LAN access devices, based on traffic patterns of each of the nodes, the security options, or the capacity and capabilities of the LAN access devices etc. These factors, among others, will cause the management device 425 to vary the portion of traffic to route across the first and second WAN backhauls.

In one embodiment, traffic portion 498 includes control and management traffic and traffic portion 499 includes the payload portion of traffic corresponding to traffic portion 498. In such an embodiment, the management device 425 implements load balancing for the first LAN 410A by routing the first portion 498 of traffic over the first WAN backhaul connection 411 and further routes the second portion 499 of the traffic over the second WAN backhaul connection 412. Separating or splitting the payload and control traffic portions in such a way reduces the overhead caused due to the control and management traffic. For example, when an IEEE 802.11n LAN access device is operating in the presence of a legacy station operating on IEEE 802.11b, there will be substantial overhead due to control frames such as RTS/CTS and ACK. In such an event, routing all the control traffic over the second WAN backhaul can help reduce overhead and improve throughput.

Figure 4B:
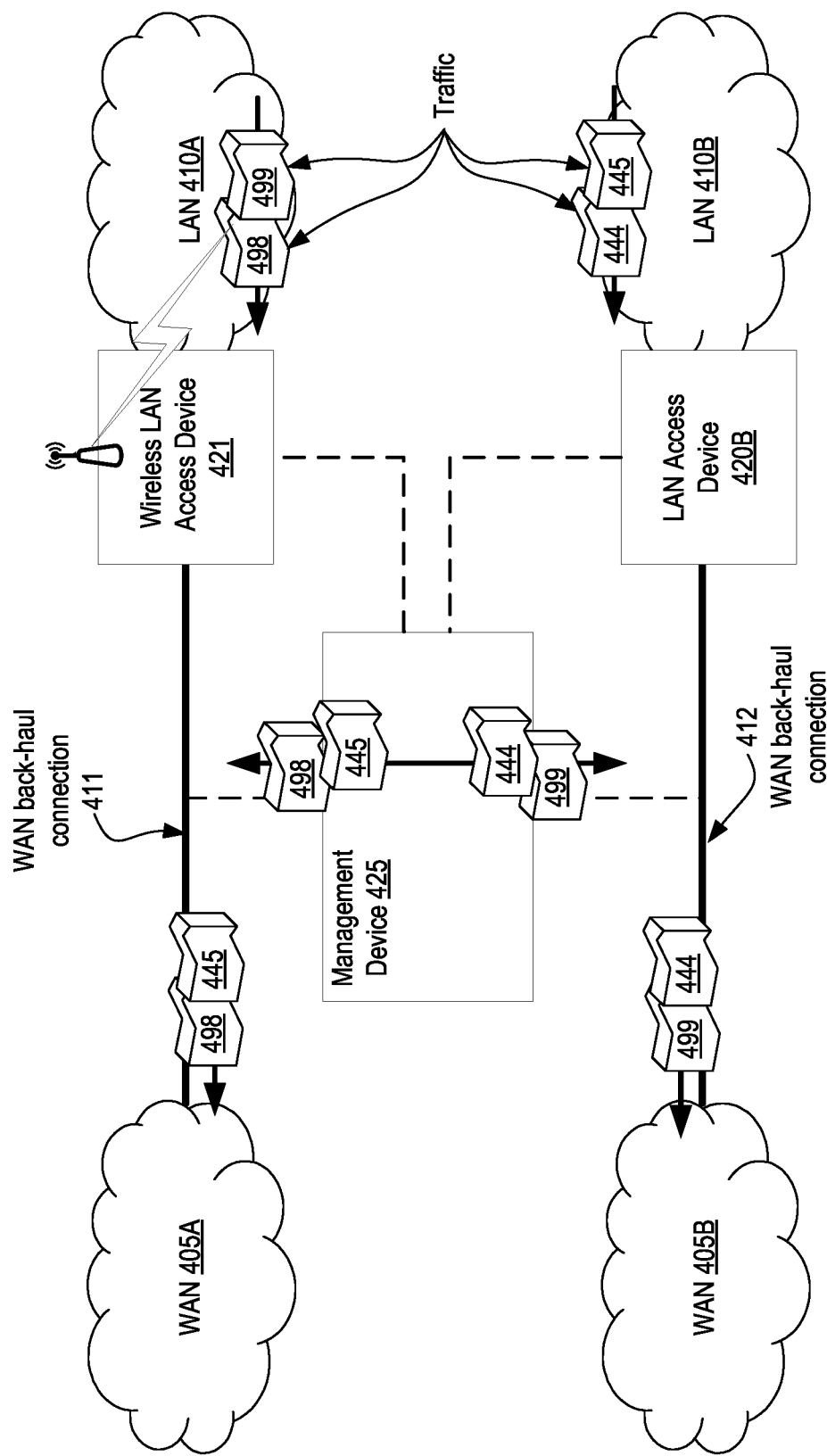

FIG. 4B illustrates an alternative exemplary architecture 401 in which embodiments may operate. In accordance with one embodiment, first LAN access device is a wireless LAN access device 421 having a first transfer rate for the first LAN 410A which is greater than a second transfer rate for the first WAN backhaul connection 411, in which the second transfer rate for the first WAN backhaul connection 411 results (e.g., causes) a bottleneck to the traffic (e.g., the first and second portions 498 and 499) originating from the wireless LAN access device 421 directed to the first WAN backhaul connection 411. In one embodiment, the management device 425 implements load-balancing for the first LAN 410A by routing the first portion 498 of traffic over the first WAN backhaul connection 411 at a rate which is less than the second transfer rate for the first WAN backhaul connection 411 and further by routing the second portion of the traffic 499 over the second WAN backhaul connection 412, in which the second portion 499 of the traffic is a remaining portion of the traffic originating from the first LAN 410A.

In one embodiment, the management device 425 implements load-balancing for the first LAN 410A by implementing an aggregate transfer rate for WAN connectivity provided to the first LAN 410A by the wireless LAN access device 421 and by implementing an aggregate transfer rate for WAN connectivity provided to the second LAN 410B, in which the aggregate transfer rate for WAN connectivity is greater than the second transfer rate for the first WAN backhaul connection 411. For example, by utilizing both the first and second WAN backhaul connections 411 and 412, an aggregate transfer rate for WAN connectivity can be realized for the LANs 410A-B which is greater than they would otherwise attain from using only their respective single WAN backhaul connections (e.g., either 411 or 412, but not both). In an alternative embodiment, the management device 425 implements load-balancing for the first LAN 410A by assigning incoming flows to the most lightly-loaded WAN connection. For example, the management device 425 may assign, route, or otherwise place a new incoming flow, such as a new VoIP connection or Internet TV stream, onto the most lightly-loaded WAN connection.

In one embodiment, the management device 425 routes the first portion 498 of traffic over the first WAN backhaul connection 411 and further routes the second portion 499 of the traffic over the second WAN backhaul connection 412 by allocating a portion of bandwidth associated with the second WAN backhaul connection 412 to the first LAN access device (e.g., 420A from FIG. 4A or the wireless LAN access device 421 of FIG. 4B), in which the allocation is based on a paid subscription tier or a service level tier associated with the first LAN access device (420A or 421). For example, the paid subscription tier or a service level tier may be chosen by a user when signing up for service from a service provider. A user may elect to pay an increased subscription fee to enable a higher aggregate transfer rate than is otherwise attainable from using only a single WAN backhaul connection 411 or 412. Alternatively, a user might obtain a subsidized subscription fee to allow other users access to his unused WAN bandwidth.

FIG. 4C illustrates an alternative exemplary architecture 402 in which embodiments may operate. In accordance with one embodiment, the architecture 402 or system further includes a wireless communications link 422 between the first LAN access device operating as a wireless LAN access device 421 and the second LAN access device operating as a second wireless LAN access device 423. In such an embodiment, the management device 425 instructs the wireless LAN access device 421 to route or switch the second portion of traffic 499 over the wireless communications link 422 from the first wireless LAN access device 421 to the second wireless LAN access device 423 and onto the second WAN backhaul connection 412.

In one embodiment, the second LAN access device 423 can operate as a wireless LAN access device, distinct from the first wireless LAN access device 421. The communication link 422 may be a wireless communication link between the first LAN access device operating as a wireless LAN access device 421 and the second LAN access device operating as a second wireless LAN access device 423.

In accordance with one embodiment, the first WAN backhaul connection 411 provides the first LAN access device (e.g., 420A at FIG. 4A or 421 at FIG. 4C) with WAN connectivity via the first WAN backhaul connection 411 to a Service Provider that provides one or more of data connectivity, voice connectivity, video connectivity, and mobile device connectivity to a plurality of subscribers. In this embodiment, the second WAN backhaul connection 412 provides the second LAN access device (e.g., 420B at FIG. 4A or 423 at FIG. 4C) with WAN connectivity via the second WAN backhaul connection 412 to the same Service Provider via a physically distinct communications link to the same Service Provider.

In one embodiment, the first WAN backhaul connection 411 provides the first LAN access device (420A or 421) with WAN connectivity via the first WAN backhaul connection 411 to a first Service Provider that provides one or more of data connectivity, voice connectivity, video connectivity, and mobile device connectivity to a plurality of subscribers and in this embodiment, the second WAN backhaul connection 412 provides the second LAN access device (420B or 423) with WAN connectivity via the second WAN backhaul connection 412 to a second Service Provider which is separate and distinct from the first Service Provider.

Figure 4D:
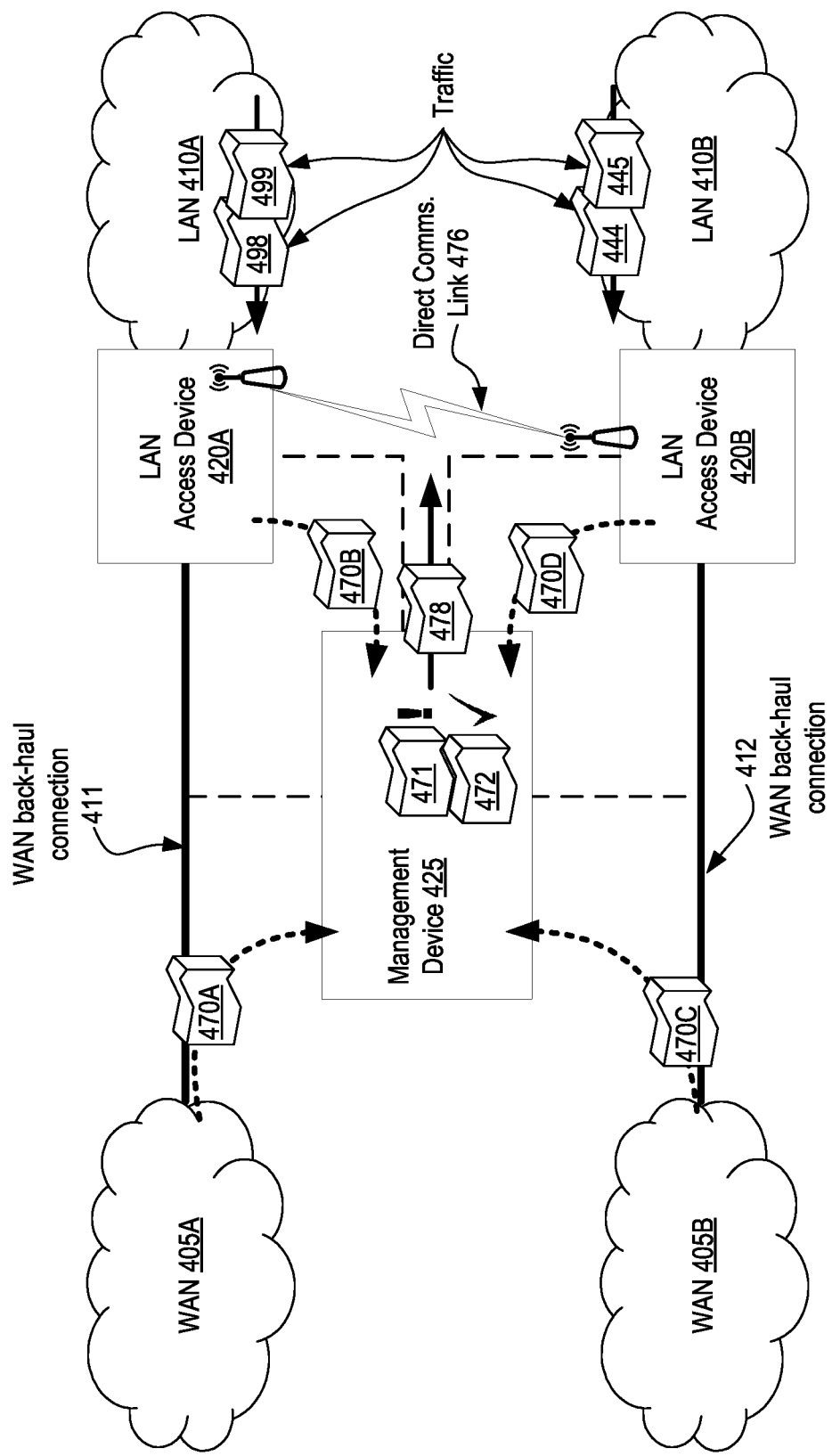

FIG. 4D illustrates an alternative exemplary architecture 403 in which embodiments may operate. In accordance with one embodiment, the architecture 403 or system further includes the management device 425 collecting a first information set 470A about the first WAN backhaul connection 411; further includes the management device 425 collecting a second information set 470B about the first LAN 410A; further includes the management device 425 collecting a third information set 470C set about the second WAN backhaul connection 412; and further includes the management device 425 collecting a fourth information set 470D about the second LAN 410B. In such an embodiment, the management device 425 jointly analyzes at least a portion from each of the first, second, third, and fourth information sets 470A-D collected and identifies an operational condition 471 affecting the first and second WAN backhaul connections 411-412 and further affecting the first and second LANs 410A-B based on the jointly analyzed collected information sets 470A-D. In accordance with such an embodiment, the management device 425 initiates a management event 472 responsive to the operational condition 471 being identified.

In one embodiment, responsive to the operational condition 471 being identified, the management device 425 initiating the management event 472 constitutes generating instructions specifying a configuration change to one or more of: a configuration change for a channel allocation associated with a wireless based first LAN access device 420A or a wireless based second LAN access device 420B, or both; a configuration change to a power allocation scheme for signals associated with the wireless based first LAN access device 420A or the wireless based second LAN access device 420B, or both; a configuration change to STA (Station) to AP (Access Point) associations associated with the wireless based first LAN access device 420A or the wireless based second LAN access device 420B, or both; a configuration change to beacon power characteristics associated with the wireless based first LAN access device 420A or the wireless based second LAN access device 420B, or both; a configuration change to beacon intervals associated with the wireless based first LAN access device 420A or the wireless based second LAN access device 420B, or both; a configuration change to transmission rates associated with the wireless based first LAN access device 420A or the wireless based second LAN access device 420B, or both; a configuration change to beamforming characteristics of the wireless based first LAN access device 420A or the wireless based second LAN access device 420B, or both; a configuration change to a Request to Send/Clear to Send (RTS/CTS) configuration associated with the wireless based first LAN access device 420A or the wireless based second LAN access device 420B, or both; a configuration change to fragmentation configuration of the wireless based first LAN access device 420A or the wireless based second LAN access device 420B, or both; a configuration change to the wireless mode (e.g. IEEE 802.11a/b/g/n) configuration of the wireless based first LAN access device 420A or the wireless based second LAN access device 420B, or both; a configuration change to the bandwidth utilized by the wireless based first LAN access device 420A or the wireless based second LAN access device 420B, or both (example, channel bonding in IEEE 802.11n); a configuration change to frame aggregation of traffic from the wireless based first LAN access device 420A or the wireless based second LAN access device 420B, or both; a configuration change to guard interval of the wireless based first LAN access device 420A or the wireless based second LAN access device 420B, or both; a configuration change to an antenna array configuration of the wireless based first LAN access device 420A or to the wireless based second LAN access device 420B, or both; a configuration change to preamble length used by the wireless based first LAN access device 420A or the wireless based second LAN access device 420B, or both; a configuration change to handoff techniques of the wireless based first LAN access device 420A or the wireless based second LAN access device 420B, or both; a configuration change to power saving modes of the wireless based first LAN access device 420A or the wireless based second LAN access device 420B, or both; and a configuration change to maximum number of retransmission attempts of the wireless based first LAN access device 420A or the wireless based second LAN access device 420B, or both.

The wireless based LAN access devices involved in this configuration may be chosen from a wider set of wireless based LAN access devices already available. Such LAN access devices may support high throughput. In one embodiment, selection of these LAN access devices is based on one or more of a Received Signal Strength Indicator (RSSI), a wireless bit rate, channel usage, pre-existing traffic loads, overall achievable throughput, other similar performance indicators, or by using a combination of such indicators to estimate available throughput.

In one embodiment, the management event 472 is selected from the group of management events 472 which includes sending instructions 478 to establish a direct communications link 476 between the first LAN access device 420A and the second LAN access device 420B responsive to the joint analysis indicating an operational problem (e.g., such as the identified operational condition 471) with the first WAN backhaul connection 411. For example, the operational problem may be derived from or correspond to the identified operational condition 471.

FIG. 4E illustrates an alternative exemplary architecture 404 in which embodiments may operate. In accordance with one embodiment, the management event 472 is selected from the group of management events 472 which includes sending instructions 478 to establish a direct communications link 476 between a node 477 operating within the first LAN 410A, and the second LAN access device 420B, responsive to the joint analysis indicating an operational problem with the first LAN access device 410A. For example, responsive to the operational condition 471 being identified. The instructions 478 may correspond to or be derived from the management event 472. In accordance with the disclosed embodiments, node 477 may be implemented as one of a wireless node, a mobile node, or as a LAN device node.

In accordance with several of the various embodiments, the management device 425 jointly analyzes the collected information sets 470A-D by analyzing bandwidth usage over time of the first LAN 410A and bandwidth usage over time of the second LAN 410B and detects, as the operational condition 471, a traffic imbalance between the first LAN 410A and the second LAN 410B. In such an embodiment, initiating the management event 472 constitutes the management device 425 allocating unused bandwidth associated with the first WAN backhaul connection 411 to the second LAN access device 420A or constitutes allocating unused bandwidth associated with the second WAN backhaul connection 412 to the first LAN access device 420A based on the identified traffic imbalance between the first LAN 410A and the second LAN 410B.

In one embodiment, initiating the management event 472 constitutes the management device 425 determining whether a LAN access device has unused bandwidth at a given time of the day or week. In such an embodiment, in addition to or as an alternative to utilizing the bandwidth for a second LAN device, multiple SSIDs may be used to open the unused bandwidth for public or private usage during the given time of the day or week or during some other specified time.

In accordance with several of the various embodiments, the second information set 470B about the first LAN 410A and the fourth information set 470D about the second LAN 410B each include information specific to a first communication layer of the first and second LANs 410A-B and the first information set 470A about the first WAN backhaul connection 411 and the third information set 470C about the second WAN backhaul connection 412 includes information specific to a second communication layer of the first and second WAN backhaul connections 411-412 which is different than the first communication layer of the first and second LANs 410A-B.

FIG. 4F illustrates an alternative exemplary architecture 406 in which embodiments may operate. In accordance with one embodiment, the second information set 470B about the first LAN 410A and the fourth information set 470D about the second LAN 410B each include neighborhood analysis relating to Internet connectivity provided to a plurality of other locations in a shared geographical area 469 with the management device 425. In such an embodiment, the management device 425 initiating the management event 472 responsive to the operational condition 471 being identified constitutes generating instructions 479 to change a configuration of the first WAN backhaul connection 411 or constitutes generating instructions 479 to change a configuration of the second WAN backhaul connection 412, or both, based on the neighborhood analysis.

In accordance with one embodiment, the first information set 470A about the first WAN 410A and the third information set 470C about the second WAN 410B each include neighborhood analysis relating to Internet connectivity provided to a plurality of other locations in a shared geographical area 469 with the management device and the management device 425 initiating the management event 472 responsive to the operational condition being identified 471 constitutes the management device 425 generating instructions 479 to change a configuration of the first LAN access device 420A or the second LAN access device 420B, or both, based on the neighborhood analysis. The neighborhood analysis and the various information sets 470A-D depicted at FIGS. 4D through 4F may be utilized in association with the other disclosed embodiments described herein, including all of the exemplary embodiments depicted and described with regard to FIGS. 4A through 4E.

In one embodiment, the management device 425 initiating the management event 472 responsive to the operational condition being identified 471 constitutes the management device 425 generating instructions 479 to modify the identified operational condition 471 in which the management device 425 communicates the generated instructions 479 to one or more of: a network element 466, a WAN device 468, and/or a LAN device 467 communicatively interfaced with the management device and further in which the generated instructions 479 are communicated via a protocol selected from the group of protocols which includes: a TR-069 (Technical Report 069) compatible communications protocol; a Transmission Control Protocol/Internet Protocol (TCP/IP) communications protocol; a Simple Network Management Protocol (SNMP) communications protocol; an out-of-band telephone line protocol; a Digital Subscriber Line Embedded Operations Channel (DSL EOC) communications protocol; a cable control channel communications protocol; a power line control channel communications protocol; a Command Line Interface (CLI) protocol; and a Transaction Language 1 (TL1) communications protocol.

In accordance with one embodiment, the first WAN backhaul connection 411 and the second WAN backhaul connection 412 are each communicably interfaced with the management device 425 via one of: a wireless network connection; a wired network connection; a Digital Subscriber Line (DSL) network connection; a power line network connection; a Passive Optical Network (PON) based network connection; a fiber optic based network connection; and a cable based network connection.

In one embodiment, the management device 425 is one of: a Digital Subscriber Line (DSL) modem operating as a Customer Premises Equipment (CPE) device to communicatively interface a DSL based backhaul provided via the first WAN backhaul connection 411 to the first LAN 410A; a cable modem operating to communicatively interface a cable network based backhaul provided via the first WAN backhaul connection 411 to the first LAN 410A; a wireless modem operating to communicatively interface a wireless based backhaul provided via the first WAN backhaul connection 411 to the first LAN 410A; a power line modem operating to communicatively interface a power line based backhaul provided via the first WAN backhaul connection 411 to the first LAN 410A; an Optical Network Terminal (ONT) operating to communicatively interface a fiber optic based backhaul provided via the first WAN backhaul connection 411 to the first LAN 410A; a router operating to communicatively interface the first WAN backhaul connection 411 to the first LAN 410A; a gateway operating to communicatively interface the first WAN backhaul connection 411 to the first LAN 410A; and a computing device remotely located from a WAN/LAN interface through which a communication channel related to the first WAN backhaul connection 411 and the first LAN 410A is connected, in which the computing device provides remote monitoring and management functionality for the WAN/LAN interface.

In accordance with the various embodiments, the management device 425 collecting the first, second, third, and fourth information sets 470A-D constitutes the management device 425 collecting each of the information sets 470A-D from an information source selected from the group of information sources which includes: a Digital Subscriber Line (DSL) Customer Premises Equipment (CPE) modem; an in-home power line device; a Home Phoneline Network Alliance (HPNA) based device; an in-home coax distribution device; a G.hn compatible device; an in-home metering communication device; an in-home appliance communicatively interfaced with the LAN; a wireless femtocell base station; a wireless compatible base station; a wireless mobile device repeater; a wireless mobile device base station; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In accordance with the various embodiments, the first WAN backhaul connection 411 and the second WAN backhaul connection 412 are selected from the group of WAN backhaul connections 411 and 412 which include: a broadband connection; a DSL connection; a cable connection; a femtocell connection; a mobile connection; a fiber connection; a wireless connection; and an access Broadband over Power Line (BPL) connection.

In one embodiment, each of the first LAN 410A and the second LAN 410B include a plurality of interconnected LAN nodes 238. In such an embodiment, each of the plurality of interconnected LAN nodes 238 communicate via at least one of: an Ethernet based network connection; a wireless based network connection; an Institute of Electrical and Electronics Engineers (IEEE) 802.11 standards based network connection; an 802.11a, 802.11b, 802.11g, 802.11ad at 60 GHz, and/or 802.11n wireless compatible network connection; a femto network connection transmitting via a mobile cellular compatible protocol including at least one of a third generation (3G) compatible protocol, a fourth generation (4G) compatible protocol, and a Long Term Evolution (LTE) compatible protocol; a power line connection; a telephone system connection; a Plain Old Telephone Service (POTS) connection; a G.hn (ITU-T standardized unified high-speed wire-line based home networking) connection; and a Coax cable connection.

In one embodiment, each of the first LAN access device 420A and the second LAN access device 420B are selected from the group of devices which includes: a base station; an access point; a modem; a router; a gateway; a Digital Subscriber Line (DSL) Customer Premises Equipment (CPE) modem; an in-home power line device; a Home Phoneline Network Alliance (HPNA) based device; an in-home coax distribution device; a G.hn compatible device; an in-home metering communication device; an in-home appliance communicatively interfaced with the LAN; a wireless femtocell base station; a wireless compatible base station; a wireless mobile device repeater; a wireless mobile device base station; a set-top box (STB)/set-top unit (STU) customer electronics device; an Internet Protocol (IP) enabled television; an IP enabled media player; an IP enabled gaming console; a 60 GHz capable station; PAN (Personal Area Networks) capable device; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, each of the first LAN 410A and the second LAN 410B include a plurality of interconnected LAN nodes 238 and each of the plurality of interconnected LAN nodes 238 are selected from the group of nodes which includes: a computer with LAN connectivity; a notebook with LAN connectivity; a mobile phone with LAN connectivity; a game console with LAN connectivity; an electronic computing machine with LAN connectivity; an IPTV with LAN connectivity; storage devices with LAN connectivity; devices that are primarily purposed for other applications and can have LAN connectivity, for example, household lighting, alarm systems, heating/cooling and other household appliances, etc.

Figure 4G:
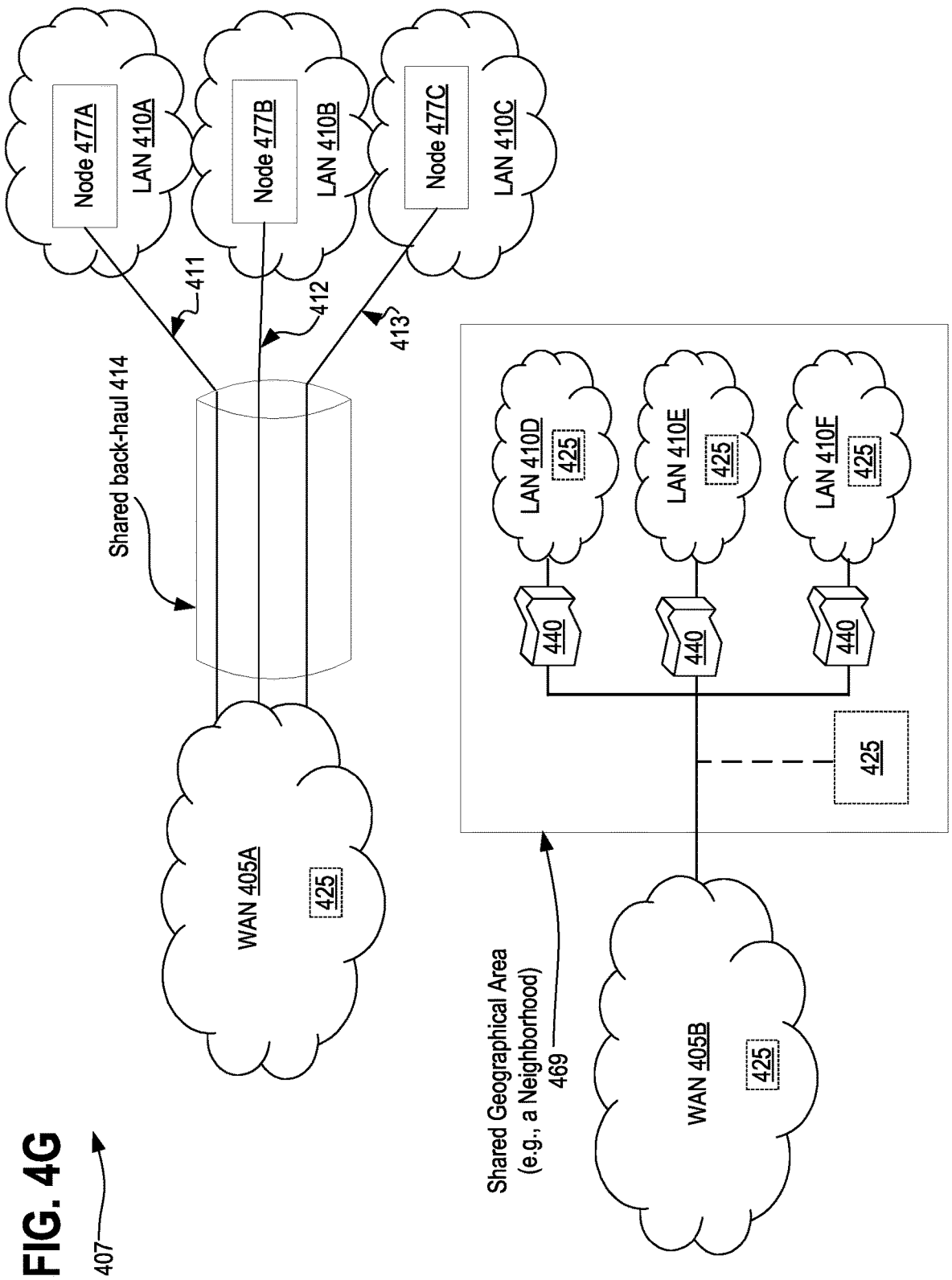

FIG. 4G illustrates an alternative exemplary architecture 407 in which embodiments may operate. In accordance with certain embodiments, the management device 425 collects, for joint analysis, information from the LANs 410A, 410B, 410C, 410D, 410E, and 410F, including neighborhood analysis 440 relating to Internet connectivity provided to a plurality of locations in a neighborhood or a shared geographical area 469 with the management device 425. In such an embodiment, initiating a management event 472 includes a management device 425 generating instructions or commands to change a configuration of a WAN device based on the neighborhood analysis 440 collected. In an alternative embodiment, initiating a management event 472 includes a management device 425 generating instructions to change a configuration of a LAN device (e.g., one of nodes 477A-C) based on the neighborhood analysis 440.

Joint analysis by the management device 425 may include conducting neighborhood analysis including aggregating information multiple sources to provide a broader analytical context. For example, nodes 477A, 477B, and 477C are depicted as traversing a shared back-haul 414 to a WAN 405A. WAN 405A includes a management device 425 implemented as described herein. Because nodes 477A-C all traverse a common or shared back-haul 414, information may be retrievable from each of the nodes 477A-C and correspondingly from Local Area Networks 410A, 410B, and 410C respectively. The information may be collected by management device 425 within WAN 405A and utilized to optimize the WAN and LAN networks and the communication paths between the respective WAN and LAN networks.

For example, a shared back-haul 414 may exist with DSL networks in which multiple twisted pair lines traverse a common DSL binder; a shared back-haul 414 may be present with multiple coaxial cable internet customers each contending for WAN based resources over a single coaxial cable over which at least a portion of WAN back-haul is implemented; a shared back-haul 414 may be present with a power line based Internet service provider in which multiple LANs (e.g., 410A-C) associated with distinct end-users contend for WAN based resources over the same physical transmission lines; a shared back-haul 414 may similarly be present where multiple LANs (e.g., 410A-C) associated with distinct end-users contend for WAN based resources over the same wireless transmission spectrum; a shared back-haul 414 may be present with fiber optic based connections each contending for WAN based resources; or a shared back-haul 414 may comprise of a combination of the above communication means, such as a combination of coaxial cable, fiber and twisted pairs.

In such embodiments, a management device 425 may collect information from multiple distinct LANs and analyze the collected information from the multiple LANs to identify an operational condition 471. Such analysis may be referred to as neighborhood analysis. The management device 425 may then report, diagnose, monitor, or generate instructions to implement an operational change via a management event 472 based on the neighborhood analysis. For example, the management device 425 may implement WAN/LAN network optimizations which include increasing transmit power and data rates to one LAN (e.g., 410A) based on determination that another LAN represented within the neighborhood analysis is inactive or has a low activity rate (e.g., LAN 410C may be determined to be underutilized). In such an embodiment, a corresponding decrease of transmit power and data rate may be implemented for the underutilized LAN (e.g., 410C in such an example).

In another embodiment, neighborhood analysis may indicate that the shared back-haul 414 is saturated due to a demand load in excess of capacity based on analysis of LAN information retrieved from the multiple distinct LANs 410A-C in which case the management device 425 may responsively implement a load-balancing algorithm on a WAN/LAN interface (e.g., a DSL modem, cable modem, ONT unit, etc.) interfacing each of the respective LANs 410A-C to the single shared back-haul 414. In such a way, overall network efficiency may be improved by reducing collisions, buffering queues, data re-transmits, and other excessive overhead waste that may occur due to an overwhelmed network communication path, such as a shared WAN back-haul 414.

In accordance with an alternative embodiment, a collection module of a management device 425 collects the neighborhood analysis from a WAN operator (e.g., WAN 405B), where the neighborhood analysis describes LAN wireless transmission channels for a plurality of locations in a shared geographical area 469 with the management device. For example, within the neighborhood or shared geographical area 469 are multiple distinct LANs 410D, 410E, and 410F. Each of the distinct LANs 410D-F are transmitting information 440 to WAN 405B, such as an ISP or Wide Area Network Operator. The information 440 sent via each of the LANs may describe various characteristics about the LAN from which the information originated. In one embodiment, the WAN 405B aggregates the information 440 and makes the aggregate information available as neighborhood analysis. Each management device 425 within each of the respective LANs 410D-F may then collect and analyze the neighborhood analysis, and may additionally implement operational changes within a corresponding LAN 410D-F based on the information collected from the WAN 405B.

Thus, in accordance with one embodiment, instructions are generated by a management device 425 to change the configuration of a LAN device based on the neighborhood analysis. In one embodiment, the generated instructions select a LAN wireless transmission channel for a LAN device communicatively interfaced with the management device 425 that minimizes wireless interference between the LAN device and a plurality of other locations in the neighborhood or shared geographical area 469 with the management device 425. In some embodiments, each of the management devices within the various LANs 410D-F implement similar instructions, although, the management devices 425 within the respective LANs 410D-F need not have operational awareness of any other management device 425 as the neighborhood analysis is collected from WAN 405B. In alternative embodiments, a management device within the WAN 405B or located elsewhere may initiate instructions to implement an operational change via a management event 472 within the WAN 405B or within multiple distinct LANs 410D-F.

In the above embodiment, operational efficiency of the individual LANs 410A-F may be improved by reducing interference between closely located LANs, based on the neighborhood analysis. Such information may be correlated by a WAN operator based on, for example, mapping overlapping identifiers to a virtually rendered neighborhood or shared geographic area 469 or alternatively, based on actual knowledge of geographic locations for multiple LANs 410, for example, by cross referencing subscribers' service address information to physical locations.

Diagnostics may similarly rely upon neighborhood analysis yielded from multiple distinct LANs 410. For example, multiple LAN devices 410A-F exhibiting high error counts, or abnormal retrains/modem resets, may be indicative of a fault within the WAN 405A-B infrastructure rather than a statistically less likely coincidence that multiple LAN side devices are each simultaneously exercising a similar fault. In a complementary way, neighborhood analysis from multiple LANs 410A-F within a common geographical area or multiple LANs associated with a single shared back-haul 414 may aid in systematically diagnosing a LAN side fault within a particular end-user consumer's local area network where similar devices operating in neighboring LANs 410A-F do not present corresponding errors or faults within the neighborhood analysis.

Figure 5A:
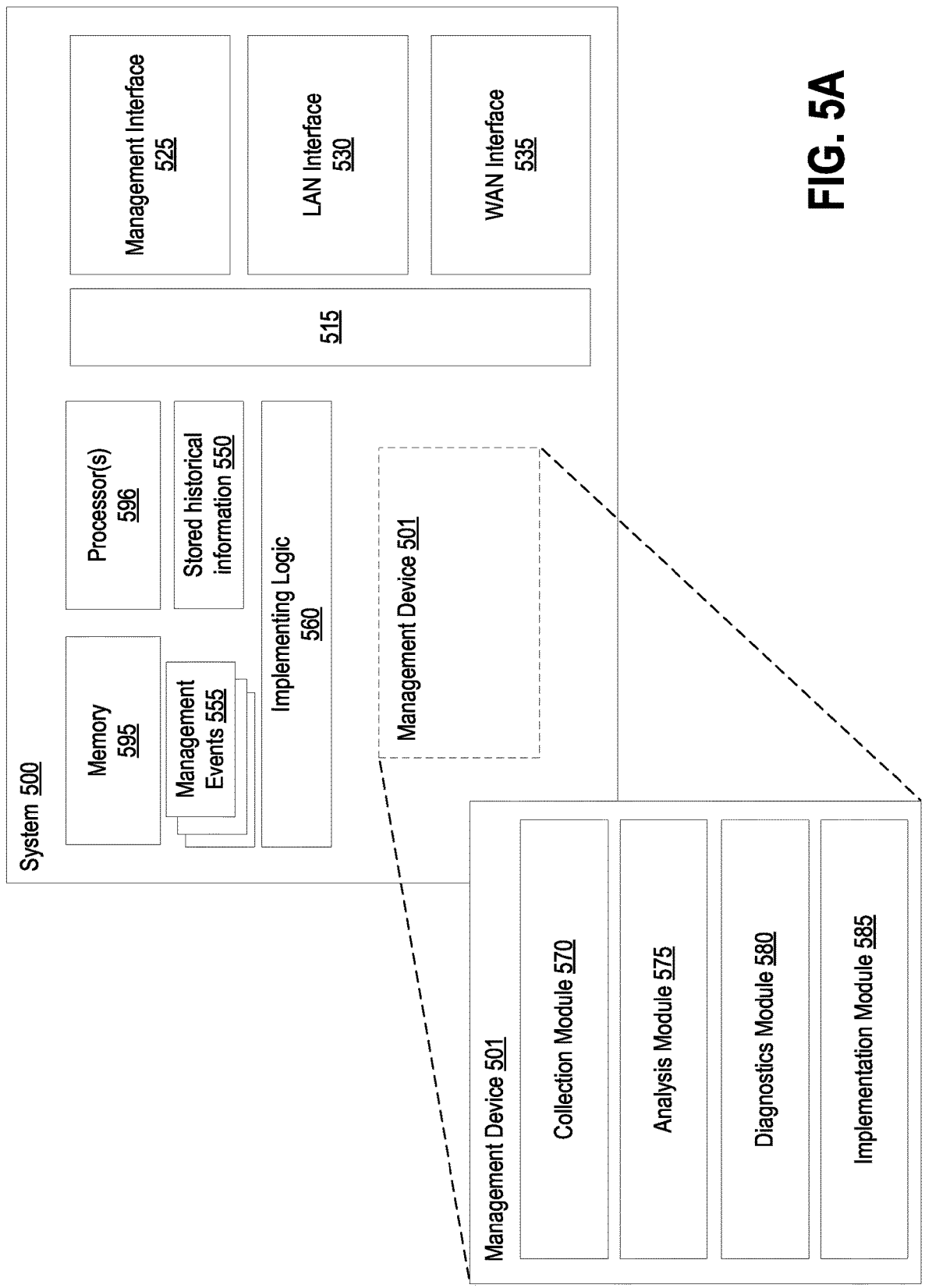
FIGS. 5A and 5B show diagrammatic representations of systems in accordance with which embodiments may operate, be installed, integrated, or configured.

FIG. 5A shows a diagrammatic representation of a system 500 in accordance with which embodiments may operate, be installed, integrated, or configured.

In one embodiment, system 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. In one embodiment, system 500 includes a communication bus 515 to interface, transfer, transact, relay, and and/or communicate information, transactions, instructions, requests, and data within system 500, and among plurality of peripheral devices. System 500 further includes management interface 525, for example, to receive requests, return responses, and otherwise interface with network elements located separately from system 500.

In some embodiments, management interface 525 communicates information via an out-of-band connection separate from LAN and/or WAN based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between the management device 501 (or one of 170, 325, or 425) and other networked devices or between the management device 501 and a third party service provider.

System 500 further includes LAN interface 530 to communicate information via a LAN based connection, including collecting LAN information from within a LAN, reporting information and diagnostics to other entities within the LAN, and for initiating instructions and commands over the LAN. Information communicated via a LAN interface 530 may, in some embodiments, traverse the LAN to a LAN to WAN interface and continue to a destination within a connected WAN. System 500 further includes WAN interface 535 to communicate information via a WAN based connection, including collecting WAN information from within a WAN, reporting information and diagnostics to other entities within the WAN, and for initiating instructions and commands over the WAN. Information communicated via WAN interface 535 may, in some embodiments, traverse the WAN to a WAN to LAN interface and continue to a LAN based destination.

System 500 further includes stored historical information 550 that may be analyzed or referenced when conducting long term trending analysis and reporting. System 500 may further include multiple management events 555, any of which may be initiated responsive to the identification of an operational condition. For example, corrective actions, additional diagnostics, information probes, configuration change requests, local commands, remote execution commands, and the like may be specified by and triggered as a management event 555. Similarly, operational reports, configuration reports, network activity reports and diagnostic reports may be generated and sent in accordance with stored management events 555. The stored historical information 550 and the management events 555 may be stored upon a hard drive, persistent data store, a database, or other storage location within system 500.

Distinct within system 500 is Management Device 501 which includes collection module 570, analysis module 575, diagnostics module 580, and implementation module 585. Management Device 501 may be installed and configured in a compatible system 500 as is depicted by FIG. 5A, or provided separately so as to operate in conjunction with appropriate implementing logic 560 or other software.

In accordance with one embodiment, collection module 570 collects information from available sources, such as LAN information and WAN information via interfaces of system 500, including one or more of management interface 525, LAN interface 530, and/or WAN interface 535. Analysis module 575 analyzes the information retrieved via collection module 570. In some embodiments, LAN information and WAN information is jointly analyzed to identify an operational condition within the LAN based on collected WAN information or identify an operational condition within the WAN based on collected LAN information. Analysis module 575 may further perform long term trending analysis based on stored historical information 550 or conduct neighborhood analysis based on aggregation data yielded from multiple separate and distinct LANs, or conduct other joint analysis based on LAN information sets received and/or based on WAN backhaul connection information sets received. Diagnostics module 580 may conduct specialized diagnostic routines and algorithms in conjunction with or separately from analysis module 575. Diagnostics module 580 may conduct additional probing diagnostics to retrieve or trigger the output of additional diagnostics information for further analysis. Implementation module 585 implements and initiates various management events 555 including generating and instantiating instructions for local or remote execution, generating and transmitting configuration change requests, generating and sending operational reports, diagnostic reports, and configuration reports.

Figure 5B:
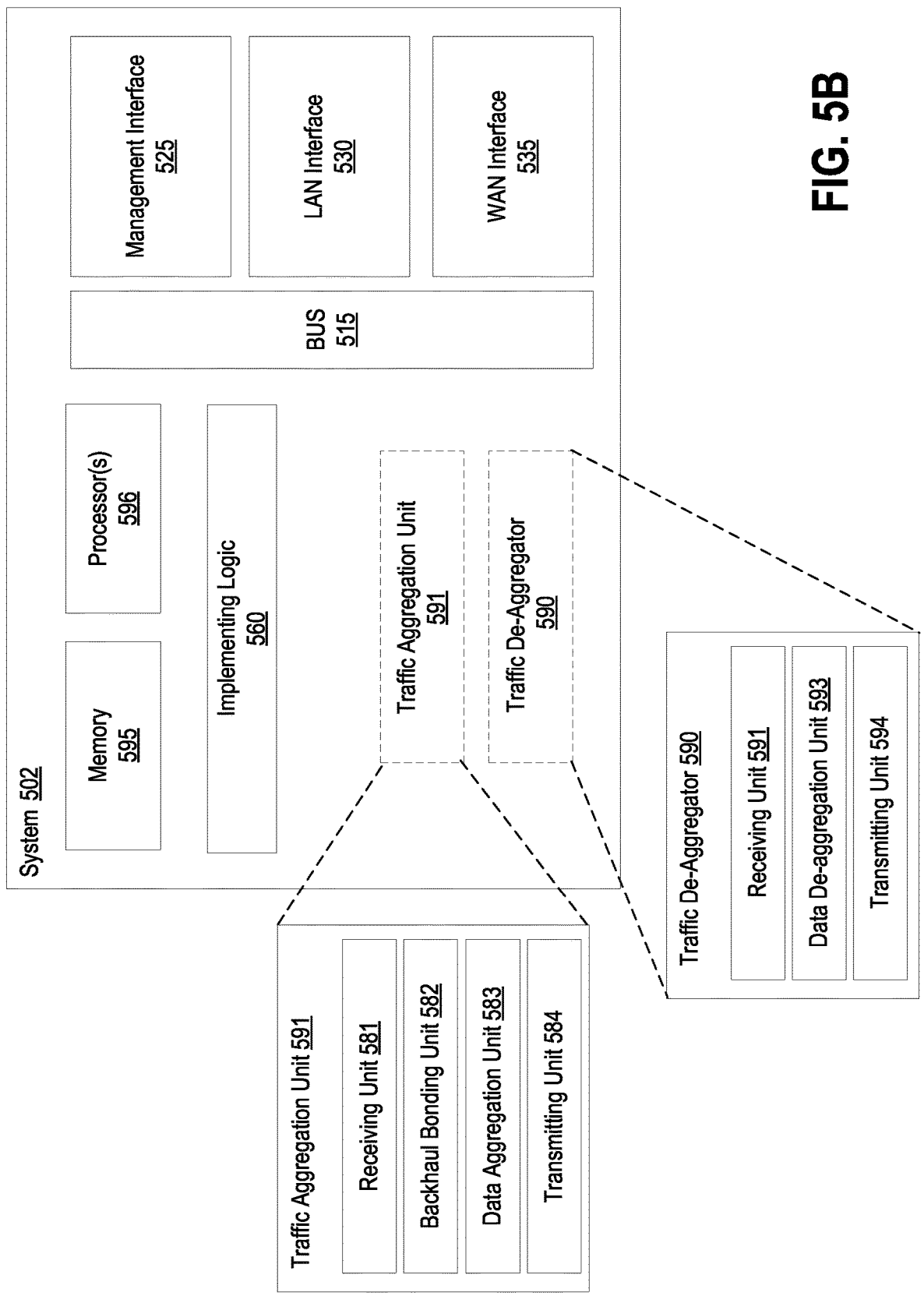

FIG. 5B shows a diagrammatic representation of a system 502 in accordance with which embodiments may operate, be installed, integrated, or configured. Depicted as before are a memory 595, processor(s), bus 515, a management interface 525 to communicate with system 502 including to communicate with sub-components 591 and 590 of system 502, LAN interface 530 capable to communicate with LANs and LAN devices, WAN interface 535 capable to communicate with WANs, WAN backhaul connections and WAN devices, and implementing logic 560.

Traffic aggregation unit 591 and traffic de-aggregator 590 are separately depicted within system 502. Traffic aggregation unit 591 includes receiving unit 581 to receive data, packets, traffic, control signals and messages, and so forth. Traffic aggregation unit 591 includes backhaul bonding unit 582 to bond multiple distinct WAN backhaul connections into a single logical backhaul connection. Traffic aggregation unit 591 includes data aggregation unit 583 to collect and aggregate data, packets, traffic, and so forth associated with multiple distinct connections, such as distinct LAN connections, and place the incoming data, packets, traffic, etc., onto a logical bonded backhaul connection formed by the traffic aggregation unit 591. The data, packets, traffic, etc., once aggregated by data aggregation unit 583 are transmitted, forwarded, or routed forward via the transmitting unit 584.

Traffic de-aggregator 590 includes receiving unit 591 to receive incoming data, packets, traffic, etc. For example, such incoming data, packets, control packets, traffic may originate from various sources within a WAN, such as from sources accessible via the Internet, and be destined for one of the LANs communicably interfaced with the traffic de-aggregator 590. Traffic de-aggregator 590 further includes data de-aggregation unit 593 to split, separate, divide up, de-aggregate incoming data, packets, traffic etc. which is received by receiving unit 591. For example, data coming into the traffic de-aggregator 590 needs to be split up and placed onto different WAN backhaul connections for transmission back to an originating source or to a target source in accordance with the described embodiments. Traffic de-aggregator 590 further includes transmitting unit 594 to place de-aggregated data, packets, frames, etc., onto multiple WAN backhaul connections for transmission to a specified target as described above.

Figure 6B:
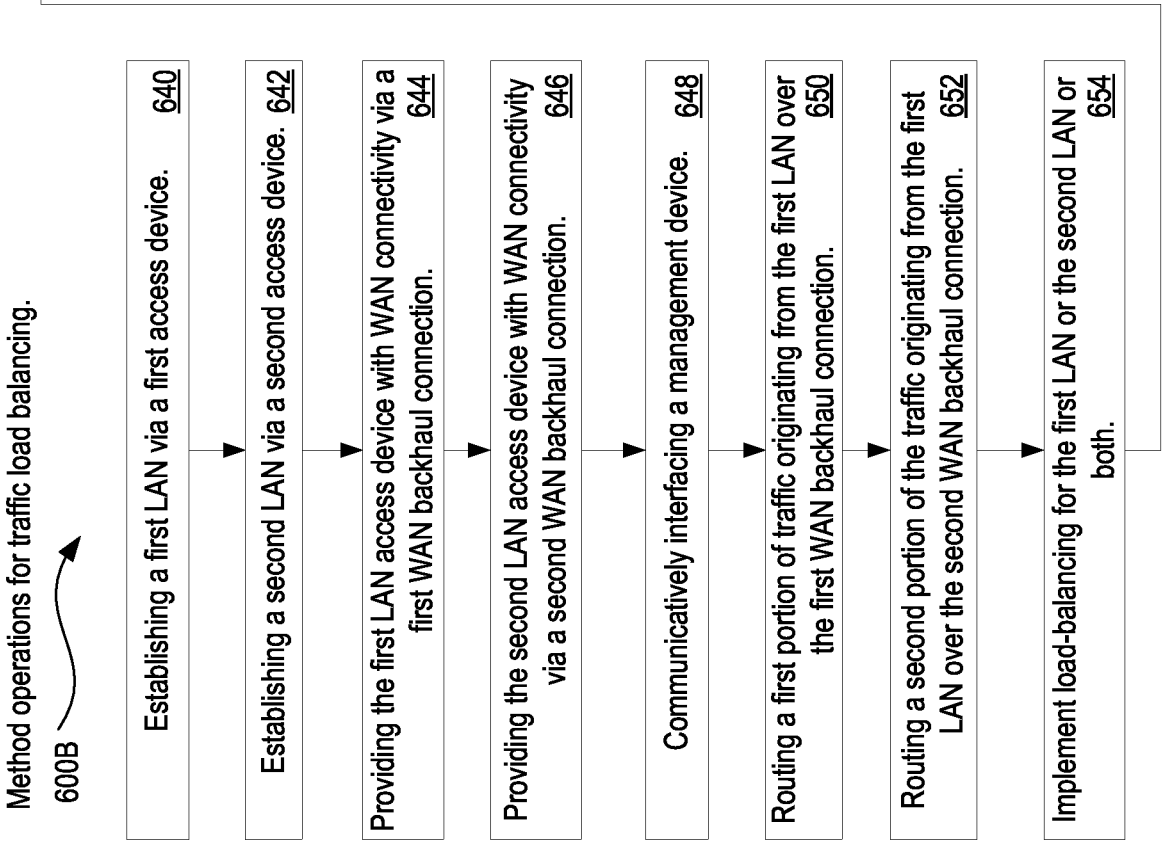

FIGS. 6A, 6B, and 6C are flow diagrams 600A, 600B, and 600C respectively, illustrating methods for traffic aggregation; methods for traffic load balancing; and methods for self-healing in accordance with described embodiments. Methods 600A, 600B, and/or 600C may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating management events, commands and instructions responsive to analysis and diagnosis, or some combination thereof). In one embodiment, methods 600A, 600B, and 600C are performed or coordinated via a Management device such as that depicted at element 170 of FIG. 1 or via a Management Device such as that depicted at element 501 of FIG. 5A. Other embodiments utilize a traffic aggregation unit such as that set forth at element 225 beginning at FIG. 2A and element 591 of FIG. 5B. Still other embodiments utilize a traffic de-aggregator such as that set forth at element 235 beginning at FIG. 2B and element 590 of FIG. 5B. Some of the blocks and/or operations listed below are optional in accordance with certain embodiments. The numbering of the blocks presented is for the sake of clarity and is not intended to prescribe an order of operations in which the various blocks must occur. Additionally, operations from the various flows 600A, 600B, and 600C may be utilized in a variety of combinations.

Method 600A begins with processing logic for establishing a first Local Area Network (LAN) via a first access device as set forth at block 602. At block 604, processing logic establishes a second LAN via a second access device.

At block 606, processing logic provides the first LAN access device with WAN connectivity via a first Wide Area Network (WAN) backhaul connection and at block 608, processing logic provides the second LAN access device with WAN connectivity via a second WAN backhaul connection.

At block 610, processing logic communicatively interfaces a traffic aggregation unit.

At block 612, processing logic forms a logically bonded WAN interface over the first WAN backhaul and the second WAN backhaul.

At block 614, processing logic combines traffic from different connections into aggregated traffic.

At block 616, processing logic communicatively interfaces a traffic de-aggregator.

At block 618, processing logic bonds Internet Protocol (IP) addresses associated with traffic originating from both the first LAN and the second LAN.

At block 620, processing logic routes the traffic having the bonded IP addresses through the traffic de-aggregator.

At block 622, processing logic provides an alternate backup communications path to the logically bonded WAN interface responsive to a failure event.

Method 600B begins with processing logic for establishing a first Local Area Network (LAN) via a first access device as set forth at block 640. At block 642, processing logic establishes a second LAN via a second access device.

At block 644, processing logic provides the first LAN access device with WAN connectivity via a first Wide Area Network (WAN) backhaul connection and at block 646, processing logic provides the second LAN access device with WAN connectivity via a second WAN backhaul connection.

At block 648, processing logic communicatively interfaces a management device.

At block 650, processing logic routes a first portion of traffic originating from the first LAN over the first WAN backhaul connection.

At block 652, processing logic routes a second portion of the traffic originating from the first LAN over the second WAN backhaul connection.

At block 654, processing logic implements load-balancing for the first LAN or the second LAN or both.

At block 656, processing logic implements an aggregate transfer rate for WAN connectivity which is greater than a transfer rate for the first or second WAN backhaul connections individually.

At block 658, processing logic allocates a portion of bandwidth associated with the second WAN backhaul connection to the first LAN access device.

At block 660, processing logic instructs a first LAN device to route or switch the second portion of traffic over a wireless communications link from the first LAN access device to the second LAN access device and onto the second WAN backhaul connection.

At block 662, processing logic collects information about the first and second WAN backhaul connections and the first and second LANs.

At block 664, processing logic jointly analyzes the collected information to identify an operational condition.

At block 666, processing logic initiates a management event responsive to the operational condition being identified.

At block 668, processing logic generates instructions specifying a configuration change to a network element responsive to the operational condition.

Method 600C begins with processing logic for establishing a first Local Area Network (LAN) via a first access device as set forth at block 680. At block 682, processing logic establishes a second LAN via a second access device.

At block 684, processing logic provides the first LAN access device with WAN connectivity via a first Wide Area Network (WAN) backhaul connection and at block 686, processing logic provides the second LAN access device with WAN connectivity via a second WAN backhaul connection.

At block 688, processing logic communicatively interfaces a management device.

At block 690, processing logic implements the management device from within the first LAN access device, from within a WAN access device, from within an externally separate and physically distinct device separate from the LAN access device and the WAN access device, or from within a service provider, and operates the management device therefrom.

At block 692, processing logic re-routes traffic responsive to a failure event.

At block 694, processing logic performs a SONET or SDH compatible rapid re-route function.

At block 696, processing logic performs a first traffic re-route operation responsive to a hard failure event characterized by a total loss of connectivity.

At block 698, processing logic performs a second traffic re-route operation responsive to a soft failure event characterized by degraded connectivity.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected (e.g., networked) to other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent database implementations), which communicate with each other via a bus 730. Main memory 704 includes information and instructions and software program components necessary for performing and executing the functions with respect to the various embodiments of the Management Device, the traffic aggregation unit, and/or the traffic de-aggregator as described herein. For example, historical WAN/LAN information 724 may be collected LAN information from a LAN and WAN information from a LAN which may be collected over a period of time and referenced later for performing trending analysis. Management events may be initiated based on historical WAN/LAN information 724. Operational conditions may be derived from historical WAN/LAN information 724. Such historical WAN/LAN information 724 may include various information sets, such as those collected from LANs, WANs, or WAN backhaul connections, historical WAN/LAN information 724 may include neighborhood analysis, and so forth. Management events 723 may be stored within main memory 704 and as collected and determined by management device 734. Main memory 704 and its sub-elements (e.g. 723 and 724) are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include one or more network interface cards 708 to communicatively interface the computer system 700 with one or more networks 720 from which information may be collected for analysis. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.). The computer system 700 may perform the functions of a Management Device 734 capable interfacing networks, monitoring, collecting, analyzing, and reporting information, and initiating, triggering, and executing various management events including the execution of commands and instructions to alter an identified operational condition or perform corrective measures on a diagnosed fault, as well as the various other functions and operations described herein. Data aggregation unit 735 implements data aggregation operations, such as collecting and combining data, traffic, frames, packets, etc., which are associated with a source, such as a LAN device or a LAN node. Data de-aggregator 733 implements data de-aggregation operations, such as collecting and splitting, dividing, separating, etc., data, traffic, frames, packets, and so forth from a source which is destined for a target, such as a node or device within a connected LAN.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The invention claimed is:

1. A femtocell base station comprising:
   a first interface that couples to a first mobile cellular device in accordance with a first cellular standard;

a second interface that couples to a first wireless backhaul, the first wireless backhaul being coupled to a cellular base station in accordance with the first cellular standard;

a third interface that couples to a second wireless backhaul, the second wireless backhaul being coupled to the cellular base station in accordance with a second cellular standard; and a network manager that is coupled to the second and third interfaces, the network manager balances traffic from the first mobile cellular device such that a first portion of traffic from the mobile cellular device is directed to the first wireless backhaul and a second portion of traffic from the mobile cellular device is directed to the second wireless backhaul.

2. The femtocell base station of claim 1 wherein the first cellular standard is LTE.

3. The femtocell base station of claim 1 wherein the second cellular standard is LTE.

4. The femtocell base station of claim 1 wherein the network manager balances traffic based at least in part on a soft failure on the first wireless backhaul.

5. The femtocell base station of claim 1 wherein the network manager balances traffic based at least in part on a hard failure of the first wireless backhaul.

6. The femtocell base station of claim 1 wherein the network manager balances traffic using a re-route operation of traffic from the first wireless backhaul to the second wireless backhaul.

7. The femtocell base station of claim 1 wherein the second and third interfaces are integrated into a single interface.

8. The femtocell base station of claim 1 wherein the first mobile cellular device is a cellular telephone.

9. The femtocell base station of claim 1 further comprising a fourth interface that couples to a second mobile cellular device in accordance with the first cellular standard.

10. The femtocell base station of claim 9 wherein the traffic being load balanced by the network manager comprises traffic from the first and second mobile cellular devices.

11. The femtocell base station of claim 10 wherein the second mobile cellular device is a cellular telephone.

12. A base station comprising:

a first interface that couples to a first mobile cellular device in accordance with a first cellular standard, the first mobile cellular device being within a cellular network of the base station;

a second interface that couples to a first wireless backhaul, the first wireless backhaul communicating in accordance with the first cellular standard;

a third interface that couples to a second wireless backhaul, the second wireless backhaul communicating in accordance with a second cellular standard; and a network manager that is coupled to the second and third interfaces, the network manager transmits traffic from the first mobile cellular device on the first wireless backhaul and the second wireless backhaul, the first and second wireless backhauls being correlated.

13. The base station of claim 12 wherein the base station is a femtocell base station.

14. The base station of claim 12 wherein the base station is a small cell base station.

15. The base station of claim 12 wherein the first and second wireless backhauls are coupled to another base station.

16. The base station of claim 12 wherein the traffic is distributed between the first and second wireless backhauls based at least in part on a soft failure on the first wireless backhaul.

17. The base station of claim 12 wherein the first wireless backhaul is a cellular backhaul.

18. The base station of claim 17 wherein the first wireless backhaul is a LTE backhaul.

19. The base station of claim 12 wherein the first and second interfaces are integrated into a single interface.

* * * * *